United States Patent
Mitarai

(10) Patent No.: US 8,341,438 B2
(45) Date of Patent: *Dec. 25, 2012

(54) INFORMATION PROCESSING DEVICE FOR ASSIGNING INTERRUPTS TO A FIRST CPU OR A SECOND CPU BASED ON A SLEEPING STATE

(75) Inventor: Shuichi Mitarai, Osaka (JP)

(73) Assignee: Panasonic Corporation, Osaka (JP)

( * ) Notice: Subject to any disclaimer, the term of this patent is extended or adjusted under 35 U.S.C. 154(b) by 195 days.

This patent is subject to a terminal disclaimer.

(21) Appl. No.: 12/726,654

(22) Filed: Mar. 18, 2010

(65) Prior Publication Data

US 2010/0185886 A1  Jul. 22, 2010

Related U.S. Application Data

(62) Division of application No. 11/658,088, filed as application No. PCT/JP2005/014116 on Aug. 2, 2005, now Pat. No. 7,725,749.

(30) Foreign Application Priority Data

Aug. 5, 2004  (JP) ................................. 2004-229634

(51) Int. Cl.
   *G06F 1/00*   (2006.01)
   *G06F 1/26*   (2006.01)
   *G06F 1/32*   (2006.01)
   *G06F 13/24*  (2006.01)
   *G06F 13/32*  (2006.01)

(52) U.S. Cl. ........ 713/300; 713/320; 713/323; 713/324; 710/260; 710/267

(58) Field of Classification Search .................. None
See application file for complete search history.

(56) References Cited

U.S. PATENT DOCUMENTS 5,867,704 A   2/1999  Tanaka et al.
(Continued)

FOREIGN PATENT DOCUMENTS

JP   4-309110   10/1992
(Continued)

OTHER PUBLICATIONS

International Search Report issued Nov. 8, 2005 in International (PCT) Application No. PCT/JP2005/014116.

*Primary Examiner* — Ji H Bae
(74) *Attorney, Agent, or Firm* — Wenderoth, Lind & Ponack, L.L.P.

(57) ABSTRACT

An information processing device of the present invention comprises a main CPU capable of taking at least two states which are an operating state and a sleeping state, a sub-CPU having power consumption lower than that of the main CPU and capable of taking at least two states which are an operating state and a sleeping state, and a process request determining section for determining which of the main CPU and the sub-CPU is caused to execute a process related to a request from a peripheral device. The process request determining section determines whether the main CPU is in the sleeping state or the operating state, and when the main CPU is in the sleeping state, determines whether or not the sub-CPU can be caused to execute the process, and when the main CPU is in the operating state, determines whether or not the main CPU can be caused to execute the process, and depending on a result of the determination, causes the main CPU or the sub-CPU to execute the process.

8 Claims, 21 Drawing Sheets

U.S. PATENT DOCUMENTS

| | | | |
|---|---|---|---|
| 6,745,335 B1 | 6/2004 | Kusano | |
| 7,117,379 B2 * | 10/2006 | Hamilton | 713/320 |
| 7,363,411 B2 * | 4/2008 | Kobayashi et al. | 710/261 |
| 7,493,435 B2 * | 2/2009 | Kobayashi et al. | 710/260 |
| 7,587,716 B2 | 9/2009 | Yoshimura | |
| 7,725,749 B2 * | 5/2010 | Mitarai | 713/323 |
| 2002/0095609 A1 | 7/2002 | Tokunaga | |
| 2002/0124196 A1 * | 9/2002 | Morrow et al. | 713/320 |
| 2004/0128563 A1 * | 7/2004 | Kaushik et al. | 713/300 |
| 2004/0225790 A1 * | 11/2004 | George et al. | 710/260 |
| 2005/0132239 A1 | 6/2005 | Athas et al. | |
| 2005/0172164 A1 | 8/2005 | Fox et al. | |

FOREIGN PATENT DOCUMENTS

| | | |
|---|---|---|
| JP | 11-007344 | 1/1999 |
| JP | 2001-109729 | 4/2001 |
| JP | 2002-215597 | 8/2002 |
| JP | 2002-288150 | 10/2002 |

* cited by examiner

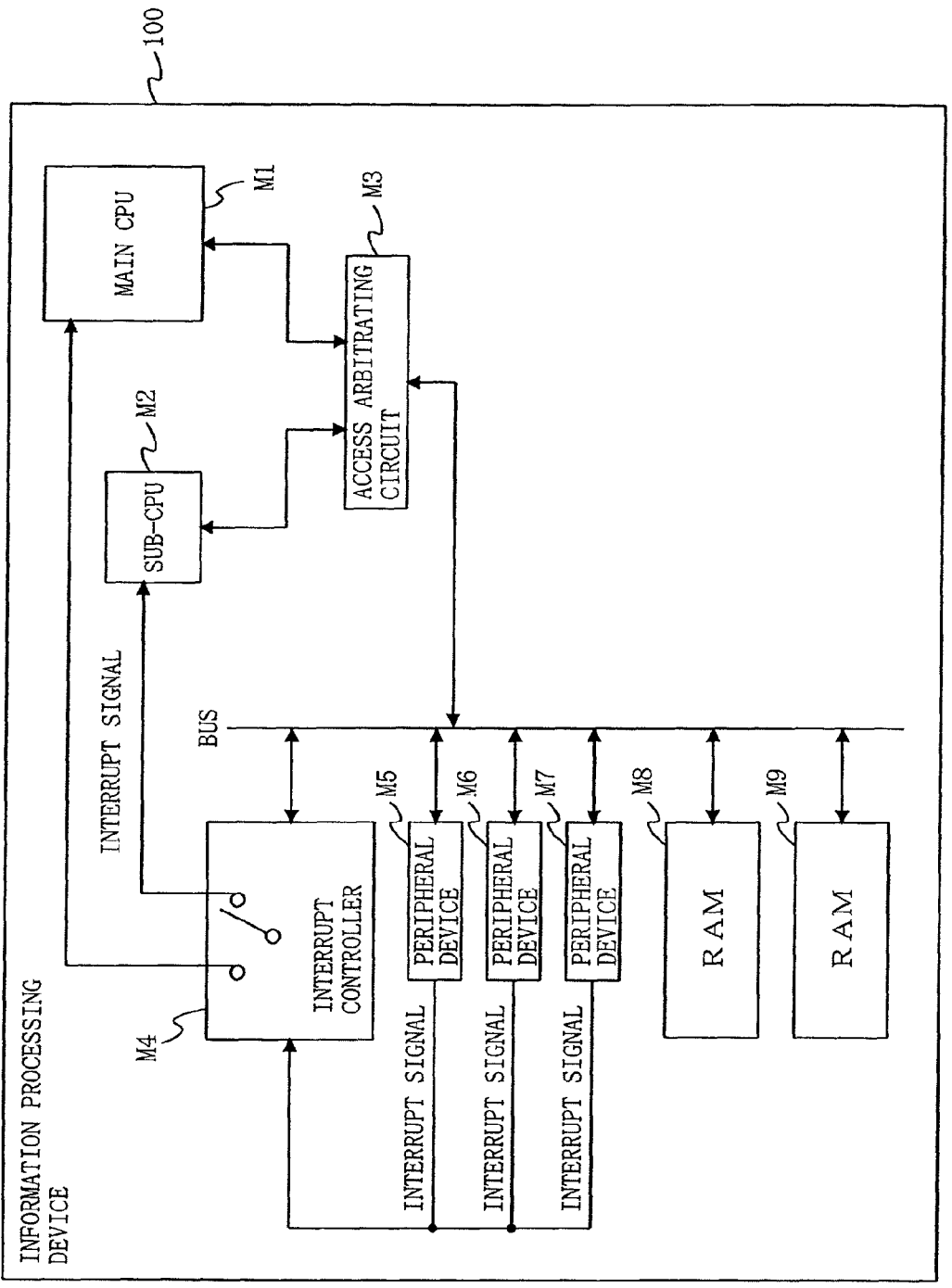
F I G. 1

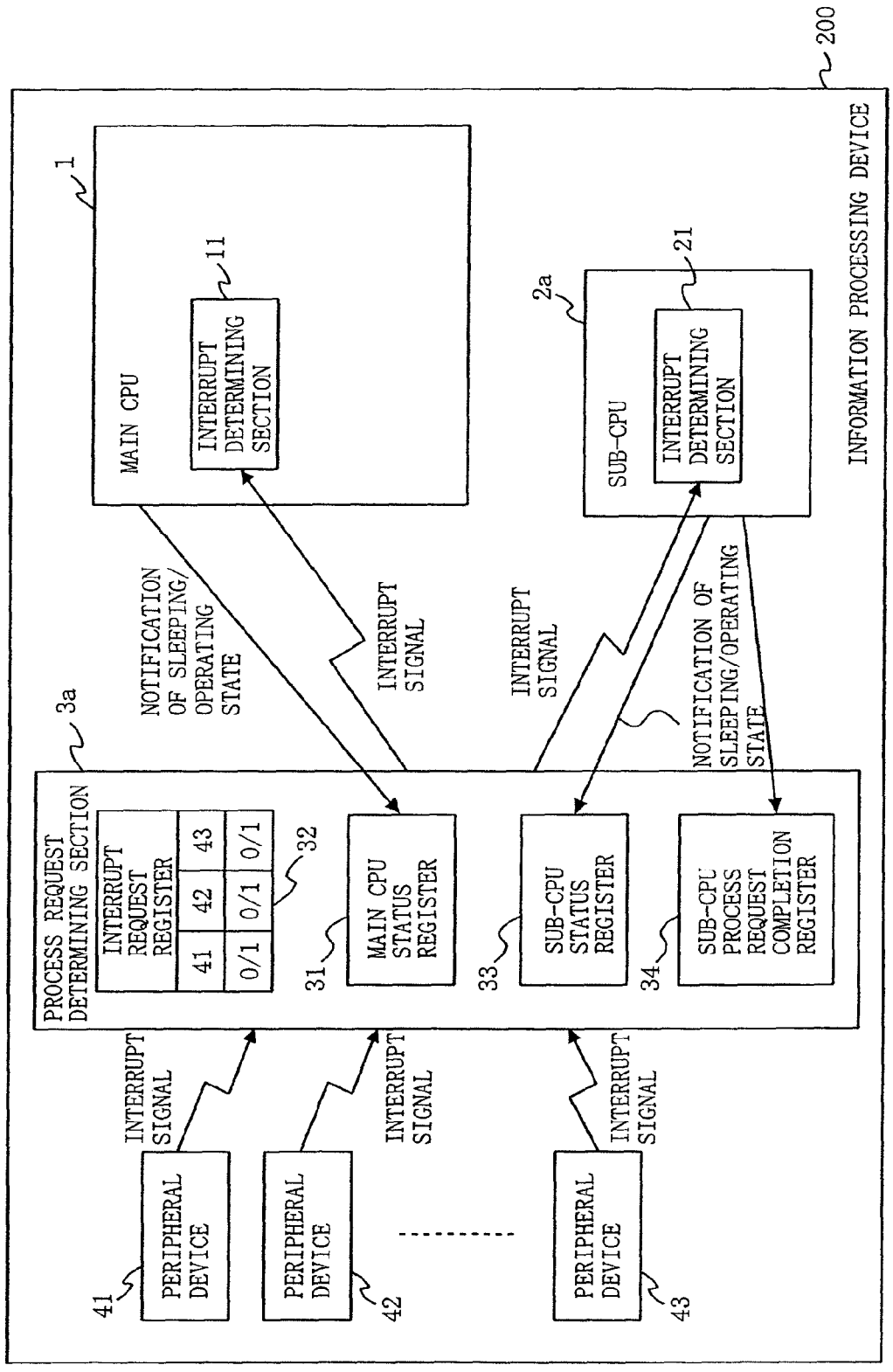
F I G. 4

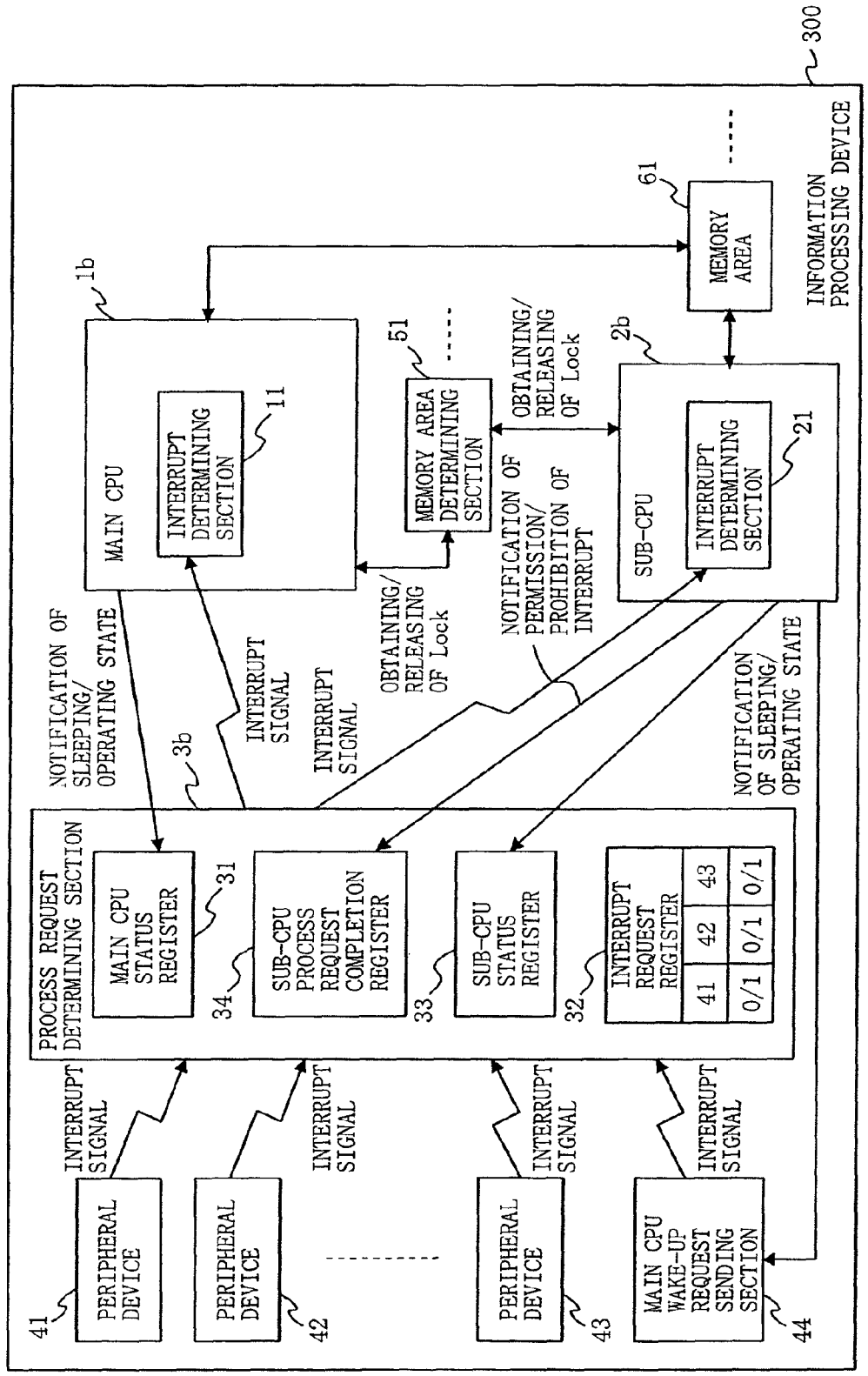

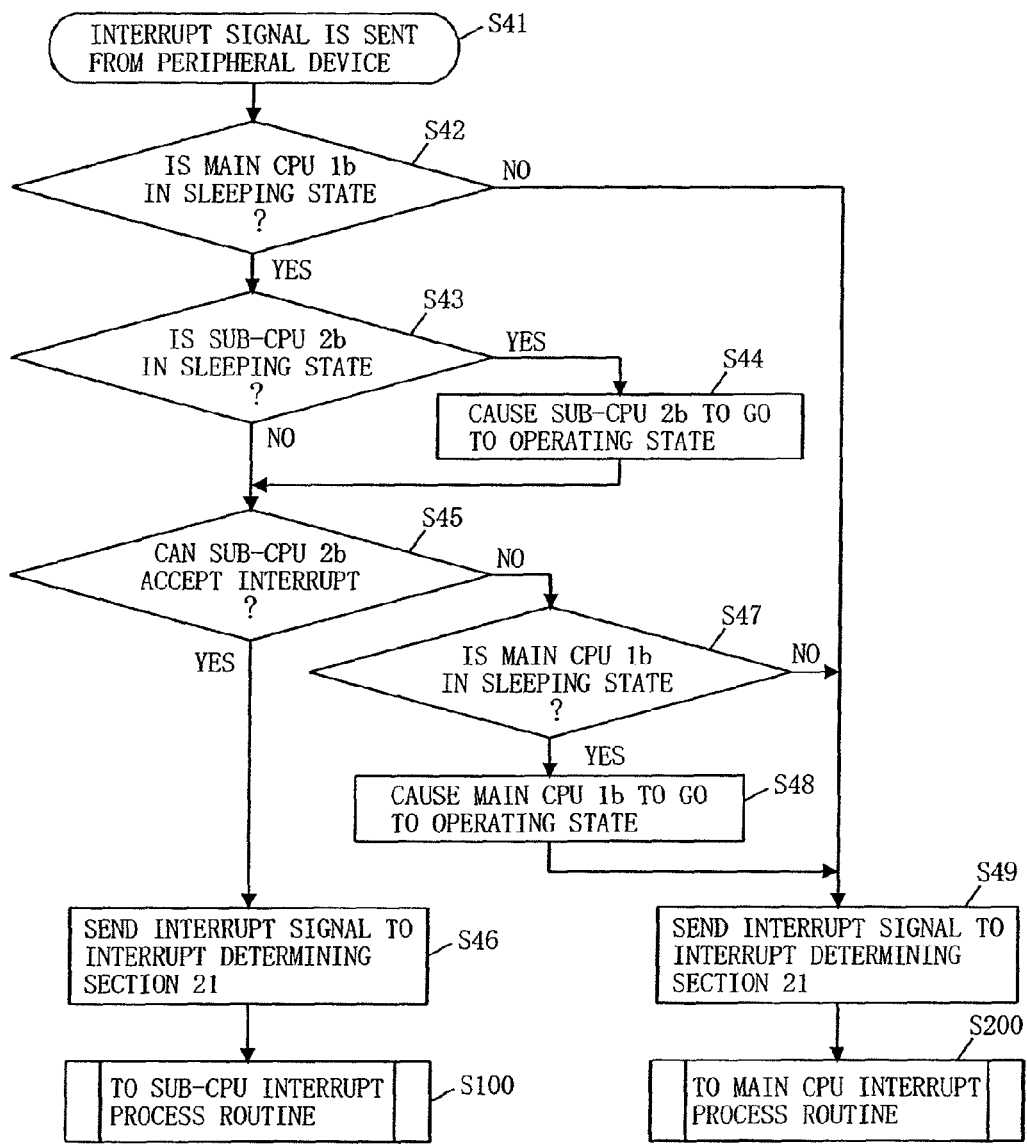
F I G. 7A

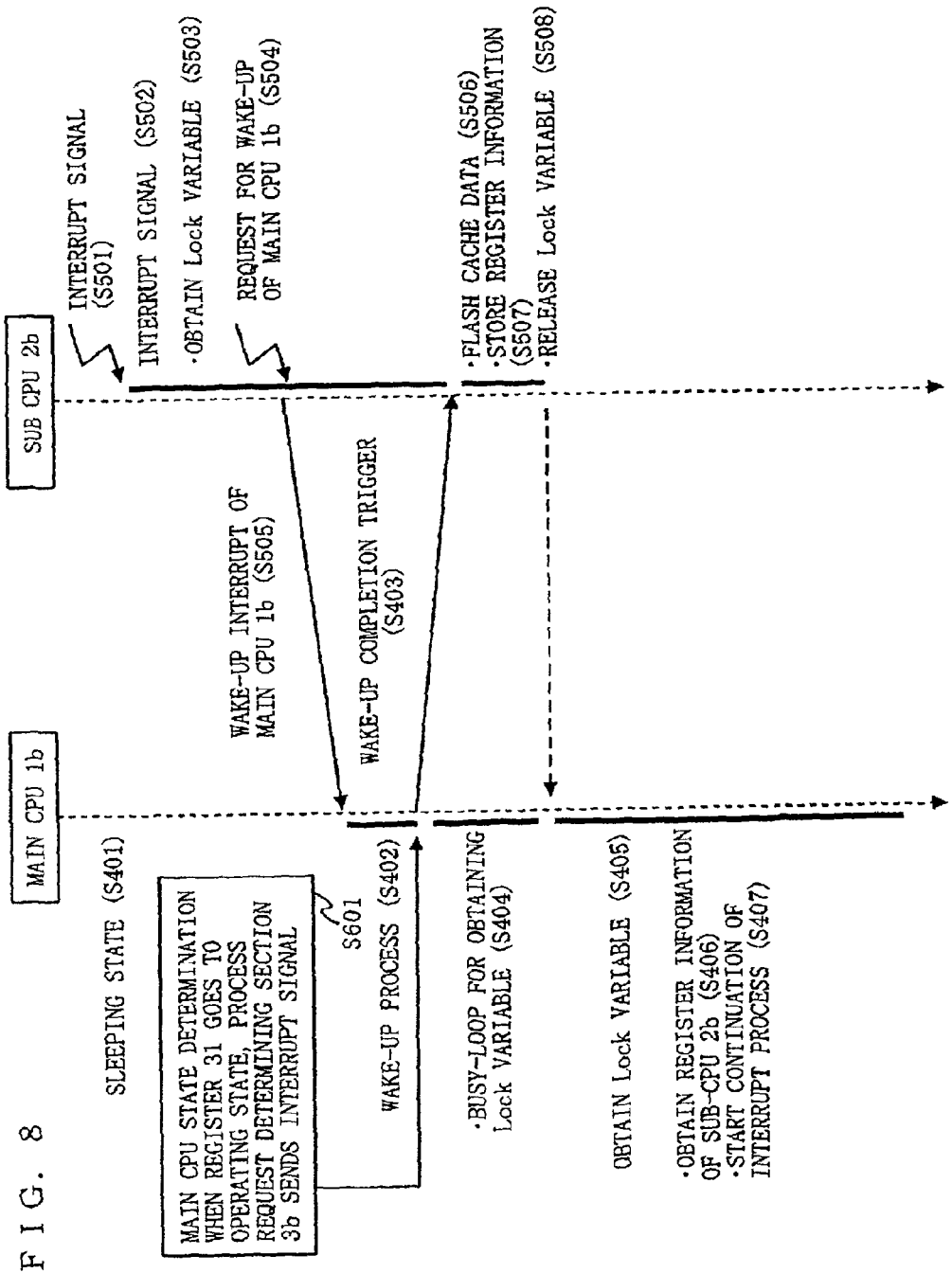

F I G. 1 2

| PROCESS REQUEST DESTINATION DESIGNATING SECTION | | |
|---|---|---|
| INTERRUPT SIGNAL | DESIGNATED CPU INFORMATION | OTHER CPU AVAILABILITY INFORMATION |
| PERIPHERAL DEVICE 41 | MAIN CPU 1c | POSSIBLE |
| PERIPHERAL DEVICE 42 | SUB-CPU 2a | IMPOSSIBLE |
| ⋮ | ⋮ | ⋮ |
| PERIPHERAL DEVICE 43 | SUB-CPU 2a | IMPOSSIBLE |

FIG. 15

| PROCESS REQUEST DESTINATION DESIGNATING SECTION | |
|---|---|
| INTERRUPT SIGNAL | DESIGNATED CPU INFORMATION |
| PERIPHERAL DEVICE 41 | MAIN CPU 1 |
| PERIPHERAL DEVICE 42 | SUB-CPU 2 |
| ⋮ | ⋮ |
| PERIPHERAL DEVICE 43 | SUB-CPU 2 |

INFORMATION PROCESSING DEVICE FOR ASSIGNING INTERRUPTS TO A FIRST CPU OR A SECOND CPU BASED ON A SLEEPING STATE

This application is a divisional of Ser. No. 11/658,088 filed Jan. 22, 2007, now U.S. Pat. No. 7,725,749 which is a National Stage Application of International Application Serial No. PCT/JP2005/014116, filed Aug. 2, 2005.

TECHNICAL FIELD

The present invention relates to an information processing device, and more particularly, to an information processing device capable of reducing power consumption.

BACKGROUND ART

In recent years, mobile information processing devices are very widespread. Mobile telephone devices, mobile personal computers, mobile personal digital assistants, and the like are representatives thereof. These mobile terminal devices are all operated while being driven by batteries. Therefore, in order to be able to use the device for a longer time, development has been conducted so as to reduce power consumption.

Particularly in mobile telephone devices, as on-board functions are increased (hereinafter referred to as an increase in the variety of on-board functions), the performance of CPUs is dramatically improved. Therefore, the proportion of power consumption of a CPU with respect to a whole device is increasing year by year, and therefore, a power saving technique for CPUs is required. Also, due to the increase of the variety of on-board functions, there is a disparity between high system requirements and low system requirements.

For example, orthodox processes, such as a process for a standby screen of a mobile telephone device, a process for displaying a clock, and the like, have low system requirements. On the other hand, processes for new additional functions, such as a process for displaying moving images, television telephony, and the like, have high system requirements. As can be seen from these examples, there is a significant difference in CPU processing load between processes having low system requirements and processes having high system requirements. CPUs need to execute processes having high system requirements as well as processes having low system requirements, and therefore, need to have performance which satisfies all system requirements. However, there is only a handful of functions which fully utilize the performance of a CPU in a whole system.

Therefore, an information processing device which comprises a main CPU and a sub-CPU which has power consumption lower than that of the main CPU, has been proposed (see Patent Document 1). In the conventional information processing device of Patent Document 1, the main CPU and peripheral devices in a control of the main CPU are directly connected to each other, and the sub-CPU and peripheral devices in a control of the sub-CPU are directly connected to each other. Thereby, the conventional information processing device can cause the sub-CPU to execute processes having small loads, such as waiting for user's key input, timer event, and the like. Therefore, the main CPU is not uselessly executed during the time when a process having a small load is executed, thereby reducing power consumption.

Patent Document 1: Japanese Patent Laid-Open Publication No. H04-309110

DISCLOSURE OF THE INVENTION

Problems to be Solved by the Invention

However, in the conventional technique described in Patent Document 1, each CPU is directly connected to peripheral devices in a control of the CPU, so that the CPUs for controlling processes of peripheral devices are fixed. Therefore, the two CPU resources cannot be flexibly effectively utilized, depending on the state of the device. Also, it is necessary to redesign connections between the CPUs and peripheral devices every time the hardware configuration is changed.

Therefore, an object of the present invention is to provide an information processing device which achieves low power consumption and in which a CPU for executing a request from a peripheral device is not fixed to a main CPU or a sub-CPU.

Solution to the Problems

To achieve the above objects, the present invention has the following aspects. A first aspect of the present invention is directed to an information processing device for controlling more than one internal or external peripheral device, comprising a main CPU capable of taking at least two states which are an operating state and a sleeping state, a sub-CPU having power consumption lower than that of the main CPU and capable of taking at least two states which are an operating state and a sleeping state, and a process request determining section for determining which of the main CPU and the sub-CPU is caused to execute a process related to a request from one of the peripheral devices. The process request determining section determines whether the main CPU is in the sleeping state or the operating state, and when the main CPU is in the sleeping state, determines whether or not the sub-CPU can be caused to execute the process, and when the main CPU is in the operating state, determines whether or not the main CPU can be caused to execute the process, and depending on a result of the determination, causes the main CPU or the sub-CPU to execute the process.

According to the first aspect of the present invention, when the main CPU is in the sleeping state, it is determined whether the sub-CPU can be caused to execute the process. Therefore, when the sub-CPU can be caused to execute the process, the process is executed by the sub-CPU. Therefore, the main CPU can be caused to be in the sleeping state for a long time, thereby making it possible to reduce power consumption. On the other hand, when the main CPU is in the operating state, it is determined whether or not the main CPU can be caused to execute the process. Therefore, when the main CPU can be caused to execute the process, the process is executed by the main CPU. Therefore, the response speed is improved. Thus, an information processing device which has low power consumption and in which a CPU for executing a process request from a peripheral device is not fixed to the main CPU or the sub-CPU, is provided.

Preferably, when the main CPU is in the sleeping state, the process request determining section may cause the sub-CPU to execute the process. When the main CPU is in the operating state, the process request determining section may cause the main CPU to execute the process.

Thereby, when the main CPU is in the sleeping state, the sub-CPU invariably executes the process, and when the main CPU is in the operating state, the main CPU invariably executes the process.

Preferably, when the main CPU is in the sleeping state, the process request determining section may determine whether or not the sub-CPU can accept the process, and when the sub-CPU can accept the process, cause the sub-CPU to execute the process, and when the sub-CPU cannot accept the process, cause the main CPU to execute the process. When the main CPU is in the operating state, the process request determining section may cause the main CPU to execute the process.

Thereby, when the sub-CPU cannot accept the process, the main CPU is caused to execute the process, so that the response speed is improved.

Preferably, when the main CPU is in the sleeping state, the process request determining section may determine whether or not the sub-CPU can accept the process, and when the sub-CPU can accept the process, cause the sub-CPU to execute the process, and when the sub-CPU cannot accept the process, cause the main CPU to execute the process. When the main CPU is in the operating state, the process request determining section may determine whether or not the main CPU can accept the process, and when the main CPU can accept the process, cause the main CPU to execute the process, and when the main CPU cannot accept the process, determine whether or not the sub-CPU can be caused to execute the process.

Thereby, when the main CPU is in the operating state, it is determined whether or not the main CPU can accept the process. When the main CPU cannot accept the process, it is determined whether or not the sub-CPU can be caused to execute the process. Therefore, since the main CPU and the sub-CPU can execute processes in parallel, thereby making it possible to reduce power consumption and improve the response speed.

Preferably, the information processing device may further comprise a process request destination designating section defining in advance a desired CPU which is desired to execute the process, as designated CPU information, in association with a process in one of the peripheral devices. When a CPU designated by the designated CPU information of the process request destination designating section is the main CPU, the process request determining section may determine whether the main CPU is in the sleeping state or the operating state.

Thereby, when a process in the main CPU is designated, it is determined whether the main CPU is in the sleeping state or the operating state.

Preferably, the process request destination designating section may further define, as other CPU availability information, whether or not the process is permitted to be executed using a CPU other than the CPU defined in the designated CPU information, and the process request determining section, when the main CPU is in the sleeping state, may reference the other CPU availability information to determine whether or not the sub-CPU is permitted to execute the process. When the sub-CPU is permitted to execute the process, the process request determining section may determine the sub-CPU is caused to execute the process. When the sub-CPU is not permitted to execute the process, the process request determining section may determine that the main CPU is caused to execute the process.

Thereby, when the main CPU is in the sleeping state, the sub-CPU can be caused to execute the process, depending on the situation, thereby making it possible to reduce power consumption.

Preferably, the process request determining section, when the main CPU is in the operating state, may determine whether or not the main CPU can accept the process. When the main CPU can accept the process, the process request determining section may determine that the main CPU is caused to execute the process. When the main CPU cannot accept the process, the process request determining section may reference the other CPU availability information to determine whether or not the sub-CPU is permitted to execute the process. When the sub-CPU is permitted to execute the process, the process request determining section may determine that the sub-CPU is caused to execute the process. When the sub-CPU is not permitted to execute the process, the process request determining section may determine that the main CPU is caused to execute the process.

Thereby, even when the main CPU is in the operating state, the sub-CPU can be caused to operate, depending on the situation, thereby making it possible to reduce power consumption.

Preferably, when the CPU designated by the designated CPU information of the process request destination designating section is the sub-CPU, the process request determining section may determine whether the sub-CPU is in the sleeping state or the operating state to determine which of the main CPU and the sub-CPU is caused to execute the process.

Thereby, in a situation where the use of the sub-CPU is designated, when the sub-CPU is in the sleeping state, it is selected whether the sub-CPU or the main CPU is used.

Preferably, the process request destination designating section may further define, as other CPU availability information, whether or not the process is permitted to be executed using a CPU other than the CPU defined in the designated CPU information. The process request determining section, when the sub-CPU is in the sleeping state, may reference the other CPU availability information to determine whether or not the main CPU is permitted to execute the process. When the main CPU is permitted to execute the process, the process request determining section may determine the main CPU is caused to execute the process. When the main CPU is not permitted to execute the process, the process request determining section may determine that the sub-CPU is caused to execute the process.

Thereby, when the sub-CPU is in the sleeping state, the main CPU is used, depending on the situation, thereby improving the response speed.

Preferably, the process request determining section, when the sub-CPU is in the operating state, may determine whether or not the sub-CPU can accept the process. When the sub-CPU can accept the process, the process request determining section may determine that the sub-CPU is caused to execute the process. When the sub-CPU cannot accept the process, the process request determining section may reference the other CPU availability information to determine whether or not the main CPU is permitted to execute the process. When the main CPU is permitted to execute the process, the process request determining section may determine that the main CPU is caused to execute the process. When the main CPU is not permitted to execute the process, the process request determining section may determine that the sub-CPU is caused to execute the process.

Thereby, when the sub-CPU cannot accept the process, the main CPU is used, depending on the situation, so that parallel processing can be done, thereby improving the response speed.

Preferably, the information processing device may further comprise a process request destination designating section defining in advance a desired CPU which is desired to execute the process, as designated CPU information, in association with a process in one of the peripheral devices. The process request determining section, when the main CPU is in the sleeping state, may reference the designated CPU information to determine whether or not the sub-CPU is permitted to execute the process. When the sub-CPU is permitted to execute the process, the process request determining section may cause the sub-CPU to execute the process. When the sub-CPU is not permitted to execute the process, the process request determining section may cause the main CPU to execute the process.

Thereby, when the main CPU is in the sleeping state, it is determined whether or not the sub-CPU is permitted to execute the process.

Preferably, the process request determining section, when the main CPU is in the operating state, may determine whether or not the main CPU can accept the process. When the main CPU can accept the process, the process request determining section may reference the designated CPU information to determine whether or not the main CPU is permitted to execute the process. When the main CPU is permitted to execute the process, the process request determining section may cause the main CPU to execute the process. When the main CPU is not permitted to execute the process, the process request determining section may cause the sub-CPU to execute the process. When the main CPU can accept the process, the process request determining section may cause the sub-CPU to execute the process.

Thereby, when the main CPU is in the operating state, it is determined whether or not the main CPU is permitted to execute the process.

Preferably, if there is a request for waking up of the main CPU while the sub-CPU is caused to execute the process, the sub-CPU and the main CPU may execute a process for causing the main CPU to take over a process executed in the sub-CPU.

Thereby, the main CPU can take over a process in the sub-CPU.

A second aspect of the present invention is directed to a processing method for use in an information processing device for controlling more than one internal or external peripheral device, the information processing device comprising a main CPU capable of taking at least two states which are an operating state and a sleeping state, and a sub-CPU having power consumption lower than that of the main CPU and capable of taking at least two states which are an operating state and a sleeping state. The method comprises determining whether the main CPU is in the sleeping state or the operating state, and when the main CPU is in the sleeping state, determining whether or not the sub-CPU can be caused to execute a process from one of the peripheral devices, and when the main CPU is in the operating state, determining whether or not the main CPU can be caused to execute the process, and causing the main CPU or the sub-CPU to execute the process, depending on a result of the determination.

A third aspect of the present invention is directed to an integrated circuit for controlling more than one internal or external peripheral device using a main CPU capable of taking at least two states which are an operating state and a sleeping state, and a sub-CPU having power consumption lower than that of the main CPU and capable of taking at least two states which are an operating state and a sleeping state. The integrated circuit determines whether the main CPU is in the sleeping state or the operating state. When the main CPU is in the sleeping state, the integrated circuit determines whether or not the sub-CPU can be caused to execute a process from one of the peripheral devices. When the main CPU is in the operating state, the integrated circuit determines whether or not the main CPU can be caused to execute the process. The integrated circuit causes the main CPU or the sub-CPU to execute the process, depending on a result of the determination.

A fourth aspect of the present invention is directed to a program executed in a computer apparatus for causing a main CPU capable of taking at least two states which are an operating state and a sleeping state, and a sub-CPU having power consumption lower than that of the main CPU and capable of taking at least two states which are an operating state and a sleeping state, to control more than one internal or external peripheral device. The program causes the computer apparatus to determine whether the main CPU is in the sleeping state or the operating state. When the main CPU is in the sleeping state, the program causes the computer apparatus to determine whether or not the sub-CPU can be caused to execute a process from one of the peripheral devices. When the main CPU is in the operating state, the program causes the computer apparatus to determine whether or not the main CPU can be caused to execute the process. The program causes the main CPU or the sub-CPU to execute the process using the computer apparatus, depending on a result of the determination.

Effect of the Invention

According to the information processing device of the present invention, of frequently occurring events, a process having a relatively small processing load in the whole system is executed by a low frequency operation using a sub-CPU having low power consumption, thereby making it possible to cause a main CPU having high power consumption to be in the sleeping state for a longer time. Also, when the main CPU is in the operating state, the sub-CPU can be used as an auxiliary CPU, thereby making it possible to effectively use the CPUs of the information processing device and reduce power consumption. Thus, according to the present invention, an information processing device which has a low power consumption and a CPU for executing a process request from a peripheral device is not fixed to the main CPU or the sub-CPU, is provided.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram illustrating a hardware configuration of an information processing device 100 according to a first embodiment of the present invention.

FIG. 4 is a block diagram illustrating a functional configuration of an information processing device 200 according to the second embodiment of the present invention.

FIG. 6 is a block diagram illustrating a functional configuration of an information processing device 300 according to a third embodiment of the present invention.

FIG. 7A is a flowchart of an operation of the information processing device 300 of the third embodiment of the present invention.

FIG. 8 is a sequence diagram illustrating a detail of an exemplary method of causing a main CPU 1b to take over a process in a sub-CPU 2b.

FIG. 12 is a diagram illustrating exemplary information stored in a process request destination designating section 36.

FIG. 15 is a diagram illustrating another exemplary table defined in the process request destination designating section 36.

Figure 2:
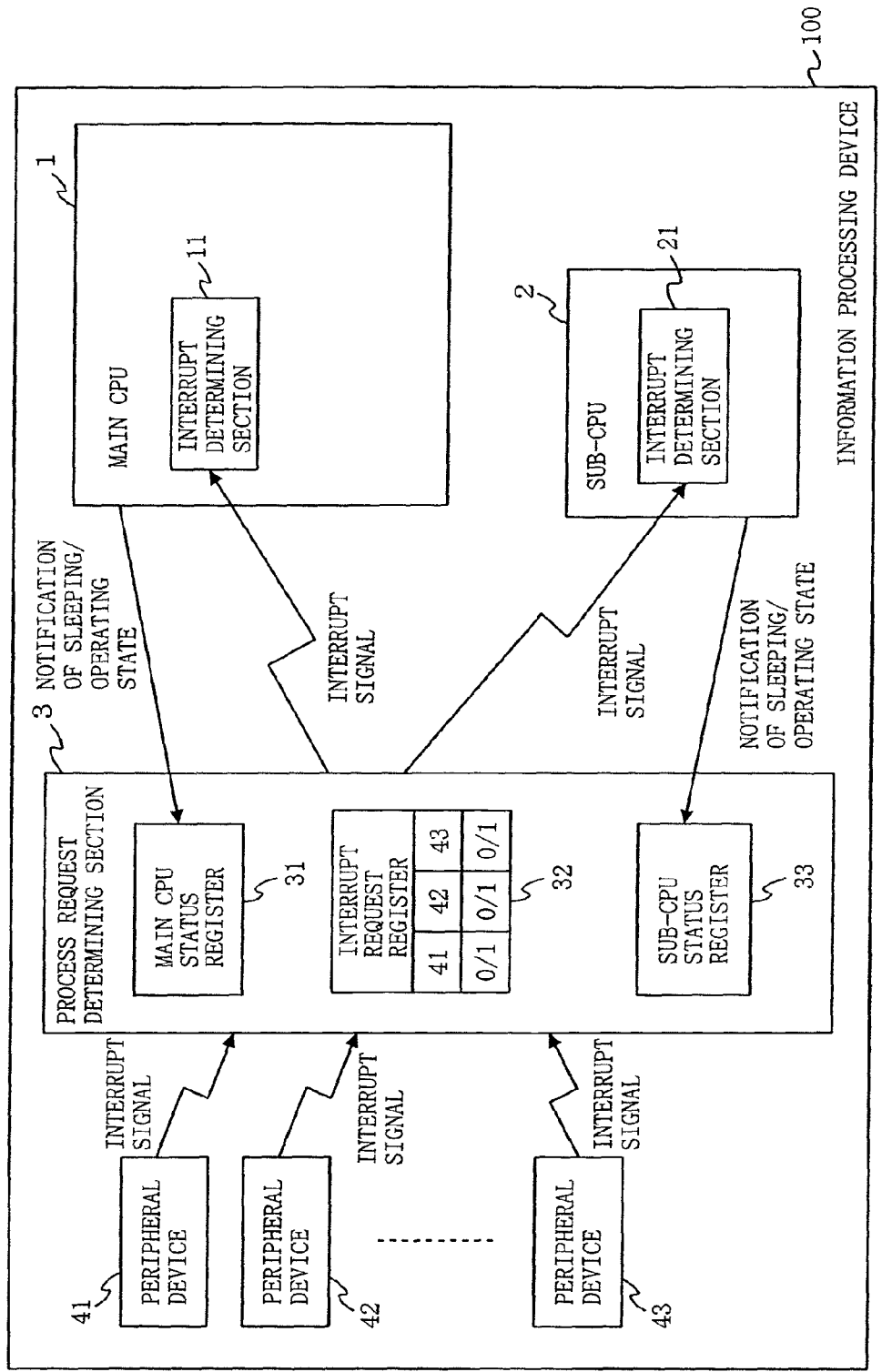
FIG. 2 is a block diagram illustrating a functional configuration of the information processing device 100 of the first embodiment of the present invention.

DESCRIPTION OF THE REFERENCE CHARACTERS 100, 200, 300, 400, 500 information processing device
M1, 1, 1b, 1c main CPU
M2, 2, 2a, 2b sub-CPU
M3 access arbitrating circuit
M4 interrupt controller
M5 to M7, 41 to 43 peripheral device
M8, M9 RAM
11 interrupt determining section
21 interrupt determining section
3, 3a process request determining section
31 main CPU status register
32 interrupt request register
33 sub-CPU status register
34 sub-CPU process request completion register
35 main CPU process request completion register
36 process request destination designating section
44 main CPU wake-up request sending section
51 memory area determining section
61 memory area

BEST MODE FOR CARRYING OUT THE INVENTION

First Embodiment

FIG. 1 is a block diagram illustrating a hardware configuration of an information processing device 100 according to a first embodiment of the present invention. In FIG. 1, the information processing device 100 comprises a main CPU (M1), a sub-CPU (M2), an access arbitrating circuit (M3), an interrupt controller (M4), peripheral devices (M5 to M7), and RAMs (M8 and M9). The numbers of the peripheral devices (M5 to M7) and the RAMs (M8 and M9) are not limited to those of the example of FIG. 1.

The main CPU (M1) is a CPU which can take two states, i.e., an operating state and a sleeping state. The sub-CPU (M2) is a CPU which has power consumption lower than that of the main CPU (M1), and can take two states, i.e., an operating state and a sleeping state. The access arbitrating circuit (M3), when accesses to a bus simultaneously occur from the main CPU (M1) and the sub-CPU (M2), manages competition arbitration. The RAMs (M8 and M9) can limit accesses from the main CPU (M1) and the sub-CPU (M2), depending on the setting. The peripheral devices (M5 to M7) are, for example, an HDD, a timer, a keyboard, a button switch, a liquid crystal display, an MPEG decoder, and the like, and are connected to the main CPU (M1) and the sub-CPU (M2) via a bus. In FIG. 1, the peripheral devices (M5 to M7) are illustrated as devices provided inside the information processing device 100, and may be provided outside the information processing device 100.

The main CPU (M1) and the sub-CPU (M2) can both access the peripheral devices (M5 to M7). The peripheral devices (M5 to M7), when desiring to execute a process, transmit an interrupt signal to the interrupt controller (M4). When receiving an interrupt signal from the peripheral devices (M5 to M7), the interrupt controller (M4) sends an interrupt signal to the main CPU (M1) or the sub-CPU (M2), depending on the state of the main CPU (M1), i.e., sends an interrupt signal to the sub-CPU (M2) when the main CPU (M1) is in the sleeping state, and an interrupt signal to the main CPU (M1) when the main CPU (M1) is in the operating state. Note that, as described above, the main CPU (M1) has the operating state and the sleeping state. Every time the state of the main CPU (M1) is changed, the interrupt controller (M4) writes the state into a register (main CPU status register) in the interrupt controller (M4).

FIG. 2 is a block diagram illustrating a functional configuration of the information processing device 100 of the first embodiment of the present invention. In FIG. 2, the information processing device 100 comprises a main CPU 1, a sub-CPU 2, a process request determining section 3, and peripheral devices 41 to 43. The main CPU 1 corresponds to the main CPU (M1) of FIG. 1. The sub-CPU 2 corresponds to the sub-CPU (M2) of FIG. 1. The process request determining section 3 corresponds to the interrupt controller (M4) of FIG. 1. The peripheral devices 41 to 43 correspond to the peripheral devices (M5 to M7) of FIG. 1.

The main CPU 1 includes an interrupt determining section 11. The sub-CPU 2 includes an interrupt determining section 21. The process request determining section 3 includes a main CPU status register 31, an interrupt request register 32, and a sub-CPU status register 33.

The main CPU 1 can take two states, i.e., an operating state and a sleeping state. The main CPU 1 sends notification of whether the main CPU 1 is in the sleeping state or the operating state, to the main CPU status register 31. The main CPU status register 31 memorizes whether the main CPU 1 is in the sleeping state or the operating state. The main CPU status register 31 changes a flag value by a write process from the main CPU 1, and writes a sleep flag when the main CPU 1 goes to the sleeping state, and an operation flag when the main CPU 1 goes to the operating state.

The sub-CPU 2 can take two states, i.e., an operating state and a sleeping state. The sub-CPU 2 sends notification of whether the sub-CPU 2 is in the sleeping state or the operating state, to the sub-CPU status register 33. The sub-CPU status register 33 memorizes whether the sub-CPU 2 is in the sleeping state or the operating state. The sub-CPU status register 33 changes a flag value by a write process from the sub-CPU 2, and writes a sleep flag when the sub-CPU 2 goes to the sleeping state, and an operation flag when the sub-CPU 2 goes to the operating state.

The main CPU 1 and the sub-CPU 2 can each control the peripheral devices 41 to 43.

The main CPU 1 and the sub-CPU 2 automatically go to the sleeping state when a required process is finished. When an interrupt signal is sent from the process request determining section 3 to the interrupt determining section 11, the main CPU 1 performs a process for going to the operating state, and when going to the operating state, writes the operation flag into the main CPU status register 31.

The interrupt request register 32 receives an interrupt signal from the peripheral devices 41 to 43, and memorizes the interrupt signal. When receiving an interrupt signal from the peripheral devices 41 to 43, the process request determining section 3 determines whether to cause the main CPU 1 or the sub-CPU 2 to execute a process, and sends the interrupt signal to the interrupt determining section 11 of the main CPU 1 or the interrupt determining section 21 of the sub-CPU 2. The interrupt determining section 11 detects the interrupt signal from the process request determining section 3. The interrupt determining section 21 detects the interrupt signal from the process request determining section 3.

Figure 3:
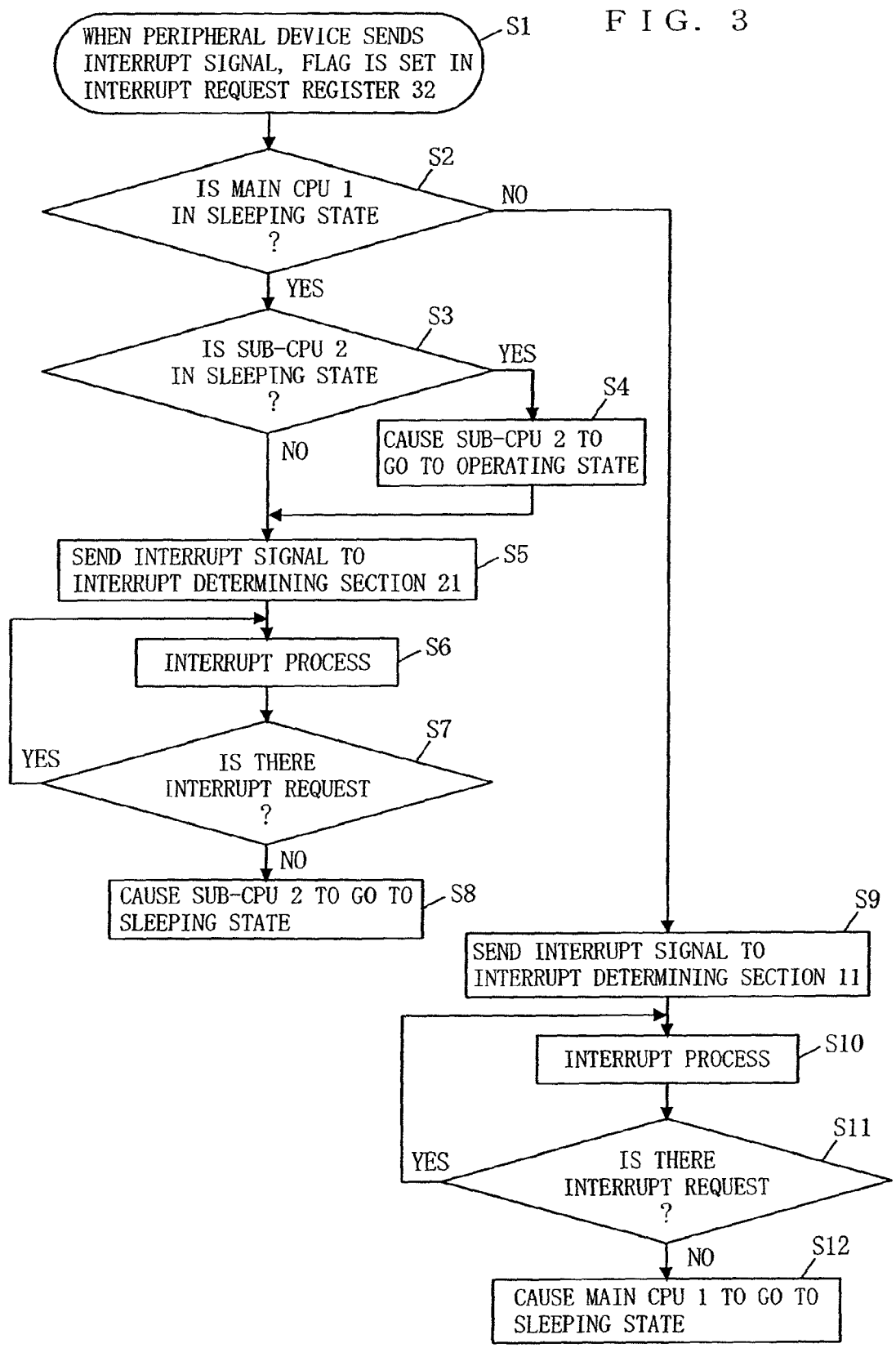
FIG. 3 is a flowchart of an operation of the information processing device 100 of the first embodiment.

FIG. 3 is a flowchart of an operation of the information processing device 100 of the first embodiment. Hereinafter, the operation of the information processing device 100 of the first embodiment will be described with reference to FIG. 3.

When an interrupt signal is sent by any of the peripheral devices 41, 42 and 43, the process request determining section 3 memorizes that the interrupt signal has occurred, by setting a flag in a portion corresponding to the peripheral device 41, 42 or 43 of the interrupt request register 32 (step S1).

Next, the process request determining section 3 determines whether or not the main CPU 1 is in the sleeping state, by referencing the main CPU status register 31 (step S2).

When the main CPU 1 is in the sleeping state, the process request determining section 3 references the sub-CPU status register 33 to determine whether or not the sub-CPU 2 is in the sleeping state (step S3). When the sub-CPU 2 is in the sleeping state, the process request determining section 3 causes the sub-CPU 2 to go to the operating state, causes the sub-CPU status register 33 to memorize that the sub-CPU 2 is in the operating state (step S4), and goes to an operation of step S5. On the other hand, when the sub-CPU 2 is in the operating state, the process request determining section 3 goes to the operation of step S5.

In step S5, the process request determining section 3 sends an interrupt signal to the interrupt determining section 21 of the sub-CPU 2 (step S5). In response to this, the sub-CPU 2 executes an interrupt process corresponding to the sent interrupt signal (step S6), and goes to an operation of step S7.

In step S7, the sub-CPU 2 confirms whether or not there is a request for a new interrupt with respect to the sub-CPU 2 during execution of step S6. When there is a request for a new interrupt, the sub-CPU 2 returns to the operation of step S6, and executes a new interrupt process. On the other hand, when there is not a request for a new interrupt, the sub-CPU 2 goes to the sleeping state (step S8). The sub-CPU 2 notifies the sub-CPU status register 33 that the sub-CPU 2 goes to the sleeping state. In response to this, the sub-CPU status register 33 memorizes that the sub-CPU 2 is in the sleeping state.

In step S2, when it is determined that the main CPU 1 is not in the sleeping state, i.e., is in the operating state, the process request determining section 3 sends an interrupt signal to the interrupt determining section 11 of the main CPU 1 (step S9). The main CPU 1 executes an interrupt process corresponding to the sent interrupt signal (step S10), and goes to an operation of step S11.

In step S11, the main CPU 1 confirms whether or not there is a request for a new interrupt with respect to the main CPU 1 during execution of step S10. When there is a request for a new interrupt, the main CPU 1 returns to the operation of step S10, and executes a new interrupt process. On the other hand, when there is not a request for a new interrupt, the main CPU 1 goes to the sleeping state (step S12). The main CPU 1 notifies the main CPU status register 31 that the main CPU 1 goes to the sleeping state. In response to this, the main CPU status register 31 memorizes that the main CPU 1 is in the sleeping state.

Thus, according to the first embodiment, the information processing device 100, when a peripheral device sends an interrupt signal, determines whether or not the main CPU 1 is in the sleeping state. When the main CPU 1 is in the sleeping state, the information processing device 100 determines that the sub-CPU 2 can be caused to execute an interrupt process, and causes the sub-CPU 2 to execute the interrupt process. Therefore, if the main CPU 1 is in the sleeping state, the information processing device 100 can execute an interrupt process without waking up the main CPU 1, so that the main CPU 1 can be caused to be in the sleeping state for a long time, thereby making it possible to reduce power consumption. On the other hand, when the main CPU 1 is in the operating state, the information processing device 100 determines that the main CPU 1 can be caused to execute an interrupt process, and causes the main CPU 1 to execute an interrupt process. Therefore, the response speed of interrupt processes can be improved. Thus, in this embodiment, since a CPU to be used is selected, depending on the operating state of the main CPU 1, the information processing device 100 which achieves low power consumption and in which a CPU for processing a request from a peripheral apparatus is not fixedly assigned, is provided. In this embodiment, it is determined which of the CPUs is used to process a process request from a peripheral device, depending on the operating states of the CPUs. Therefore, as is different from the conventional art, it is not necessary to directly connect between the CPUs and the peripheral devices or provide a clear correspondence relationship therebetween. Therefore, if the process request determining section 3 of this embodiment is used, an information processing device which achieves low power consumption and in which a CPU for executing a process request from a peripheral device is not fixed to a main CPU or a sub-CPU can be provided, even when the information processing device has a different hardware configuration.

Note that, in the first embodiment, the interrupt determining sections 11 and 21 may be provided within either the CPU or the process request determining section 3. Also, the main CPU status register 31 and the sub-CPU status register 33 may be provided within either the CPU or the process request determining section 3.

Note that a method of recording an interrupt signal into the interrupt request register 32 may be other format than that which is described above.

Second Embodiment

In a second embodiment of the present invention, an information processing device has a hardware configuration similar to that of the first embodiment, and therefore, FIG. 1 is referenced. FIG. 4 is a block diagram illustrating a functional configuration of an information processing device 200 according to the second embodiment of the present invention. In FIG. 4, the information processing device 200 comprises a main CPU 1, a sub-CPU 2a, a process request determining section 3a, and peripheral devices 41 to 43. In FIG. 4, parts having functions similar to those of the first embodiment are indicated by the same reference numerals and will not be described. The process request determining section 3a includes a main CPU status register 31, an interrupt request register 32, a sub-CPU status register 33, and a sub-CPU process request completion register 34.

The sub-CPU process request completion register 34 memorizes whether or not the sub-CPU 2a is prohibited from being interrupted. The sub-CPU 2a, when receiving an interrupt request, writes a flag indicating that the sub-CPU 2a is executing an interrupt process, into the sub-CPU process request completion register 34. The sub-CPU 2a, when finishing an interrupt process, writes a flag indicating that the sub-CPU 2a is not executing an interrupt process, into the sub-CPU process request completion register 34.

Figure 5:
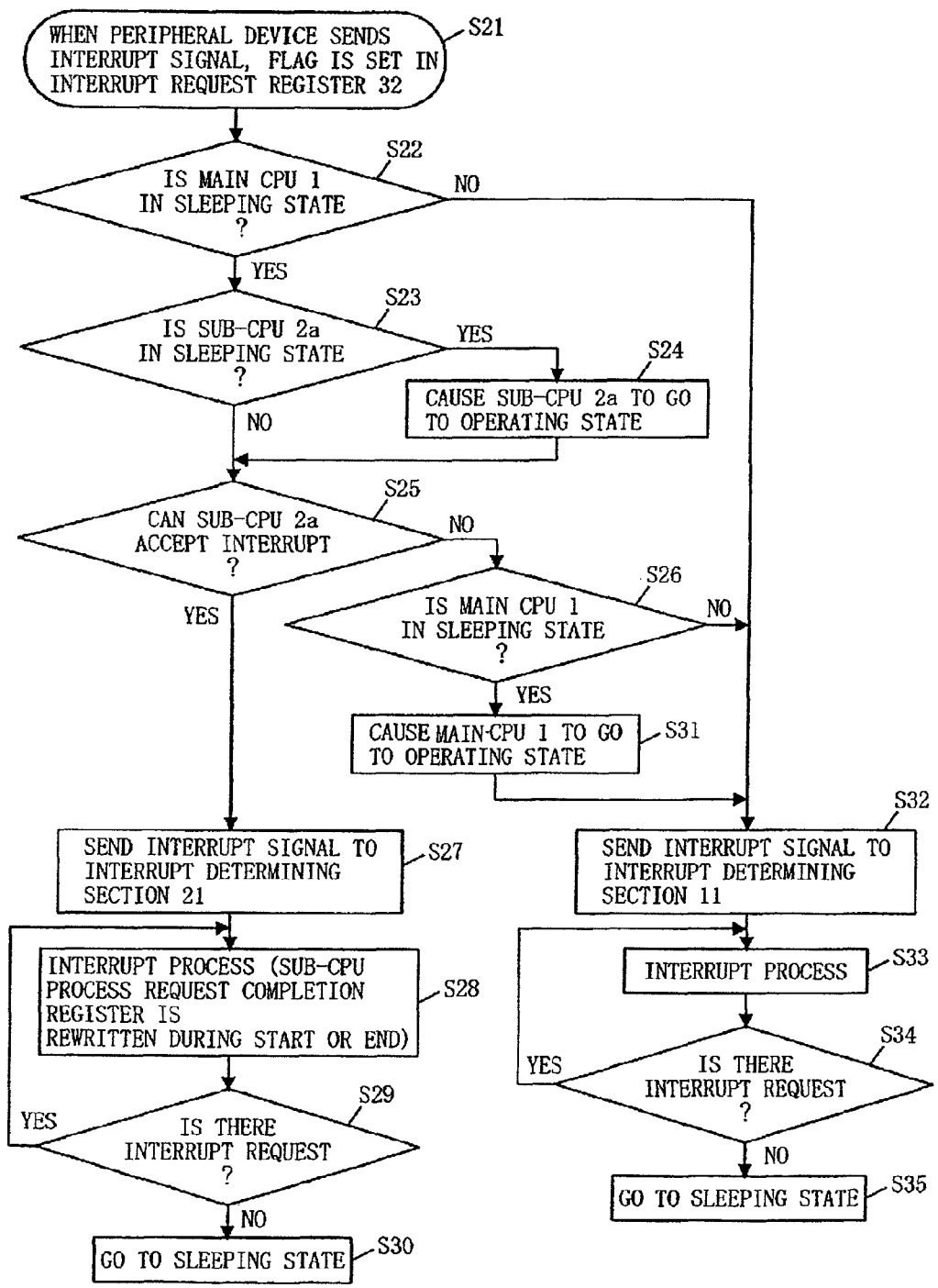
FIG. 5 is a flowchart of an operation of the information processing device 200 of the second embodiment of the present invention.

FIG. 5 is a flowchart of an operation of the information processing device 200 of the second embodiment of the present invention. Hereinafter, the operation of the information processing device 200 of the second embodiment of the present invention will be described with reference to FIG. 5.

When an interrupt signal is sent by any of the peripheral devices 41, 42 and 43, the process request determining section 3a memorizes that the interrupt signal has occurred, by setting a flag in a portion corresponding to the peripheral device 41, 42 or 43 of the interrupt request register 32 (step S21).

Next, the process request determining section 3a references the main CPU status register 31 to determine whether or not the main CPU 1 is in the sleeping state (step S22).

When the main CPU 1 is in the operating state, the process request determining section 3a goes to an operation of step S32. On the other hand, when the main CPU 1 is in the sleeping state, the process request determining section 3a references the sub-CPU status register 33 to determine whether or not the sub-CPU 2a is in the sleeping state (step S23). When the sub-CPU 2a is in the sleeping state, the process request determining section 3a causes the sub-CPU 2a to go to the operating state, rewrites the sub-CPU status register 33 (step S24), and goes to an operation of step S25. On the other hand, when the sub-CPU 2a is in the operating state, the process request determining section 3a goes to the operation of step S25.

In step S25, the process request determining section 3a references the sub-CPU process request completion register 34 to determine whether or not the sub-CPU 2a can accept an interrupt request. When the sub-CPU 2a cannot accept the interrupt request, i.e., when the sub-CPU 2a is executing an interrupt request, the process request determining section 3a goes to an operation of step S26. On the other hand, when the sub-CPU 2a can accept the interrupt request, i.e., the sub-CPU 2a is not executing an interrupt request, the process request determining section 3a goes to an operation of step S27.

In step S26, the process request determining section 3a determines whether or not the main CPU 1 is in the sleeping state. When the main CPU 1 is in the sleeping state, the process request determining section 3a causes the main CPU 1 to go to the operating state, rewrites the main CPU status register (step S31), and goes to the operation of step S32. On the other hand, when the main CPU 1 is in the operating state, the process request determining section 3a goes to the operation of step S32.

In step S27, the process request determining section 3a sends an interrupt signal to the interrupt determining section 21, and goes to an operation of step S28.

In step S28, the sub-CPU 2a executes an interrupt process. During start of the interrupt process in step S28, the sub-CPU 2a writes a flag indicating that the sub-CPU 2a is executing an interrupt process, into the sub-CPU process request completion register 34. During end of the interrupt process in step S28, the sub-CPU 2a writes a flag indicating that the sub-CPU 2a is not executing an interrupt process, into the sub-CPU process request completion register 34. After the interrupt process is finished, it is confirmed whether or not an interrupt occurs in the sub-CPU 2a again during step S28 (step S29). When an interrupt signal is detected again by the interrupt determining section 21, the process flow returns to step S28, or when an interrupt signal is not detected, the sub-CPU 2a goes to the sleeping state (step S30). The sub-CPU 2a notifies the sub-CPU status register 33 that the sub-CPU 2a goes to the sleeping state. In response to this, the sub-CPU status register 33 memorizes that the sub-CPU 2a is in the sleeping state.

In step S32, the process request determining section 3a sends an interrupt signal to the interrupt determining section 11 of the main CPU 1. Next, the main CPU 1 executes an interrupt process corresponding to the sent interrupt signal (step S33), and goes to an operation of step S34. In step S34, the main CPU 1 determines whether or not there is a request for a new interrupt with respect to the main CPU 1 during execution of step S33. When there is a request for a new interrupt, the main CPU 1 returns to the operation of step S33, and executes a new interrupt process. On the other hand, when there is not a request for a new interrupt, the main CPU 1 goes to the sleeping state (step S35). The main CPU 1 notifies the main CPU status register 31 that the main CPU 1 goes to the sleeping state. In response to this, the main CPU status register 31 memorizes that the main CPU 1 is in the sleeping state.

Thus, according to the second embodiment, the information processing device 200, when an interrupt signal is sent from a peripheral device, determines whether or not the main CPU 1 is in the sleeping state. When the main CPU 1 is in the sleeping state, the information processing device 200 determines whether or not the sub-CPU 2a can be caused to execute an interrupt process. When the sub-CPU 2a can be caused to execute the interrupt process, the information processing device 200 causes the sub-CPU 2a to execute the interrupt process. Therefore, if the main CPU 1 is in the sleeping state and the sub-CPU 2a can execute an interrupt process, the interrupt process can be executed without waking up the main CPU 1, so that the main CPU 1 can be caused to be in the sleeping state for a long time, thereby making it possible to reduce power consumption. On the other hand, when the main CPU 1 is in the sleeping state and the sub-CPU 2a cannot execute an interrupt process, the information processing device 200 causes the main CPU 1 to go to the operating state and causes the main CPU 1 to execute an interrupt process. Also, if the main CPU 1 is in the operating state, the information processing device 200 determines that the main CPU 1 can be caused to execute an interrupt process, the main CPU 1 is caused to execute the interrupt process. Therefore, the response speed of interrupt processes can be improved. Thus, in this embodiment, since a CPU to be used is selected, depending on the operating states of the main CPU 1 and the sub-CPU 2a, the information processing device 200 which achieves low power consumption and in which a CPU for processing a request from a peripheral device is not fixedly assigned, is provided. In this embodiment, it is determined which of the CPUs is used to process a process request from a peripheral device, depending on the operating states of the CPUs. Therefore, as is different from the conventional art, it is not necessary to directly connect between the CPUs and the peripheral devices or provide a clear correspondence relationship therebetween. Therefore, if the process request determining section 3a of this embodiment is used, an information processing device which achieves low power consumption and in which a CPU for executing a process request from a peripheral device is not fixed to a main CPU or a sub-CPU can be provided, even when the information processing device has a different hardware configuration.

Note that, in the second embodiment, the interrupt determining sections 11 and 21 may be provided within either the CPU or the process request determining section 3a. Also, the main CPU status register 31 and the sub-CPU status register 33 may be provided within either the CPU or the process request determining section 3a. The sub-CPU process request completion register 34 may also be provided within either the CPU or the process request determining section 3a.

Note that a method of recording an interrupt signal into the interrupt request register 32 may be other format than that of FIG. 2.

Third Embodiment

In a third embodiment of the present invention, an information processing device has a hardware configuration similar to that of the first embodiment, and therefore, FIG. 1 is referenced. FIG. 6 is a block diagram illustrating a functional configuration of an information processing device 300 according to a third embodiment of the present invention. In FIG. 6, the information processing device 300 comprises a main CPU 1b, a sub-CPU 2b, a process request determining section 3b, peripheral devices 41 to 43, a main CPU wake-up request sending section 44, a memory area determining section 51, and a memory area 61. In FIG. 6, parts having functions similar to those of the first and second embodiments are indicated by the same reference numerals and will not be described in detail.

The memory area 61 is a memory area which can be referenced by the main CPU 1b and the sub-CPU 2b. The memory area 61 corresponds to the RAMs (M8 and M9) of FIG. 1.

The memory area determining section 51 memorizes whether or not the memory area 61 is being used by the sub-CPU 2b. The memory area determining section 51 manages a state of the memory area 61 used by the sub-CPU 2b, using a Lock variable. The memory area determining section 51 corresponds to the RAMs (M8 and M9) of FIG. 1. The memory area determining section 51 memorizes a flag indicating that the memory area 61 is being referenced, into the Lock variable while the memory area 61 is being referenced by the sub-CPU 2b. Note that the flag is set by the sub-CPU 2b when the sub-CPU 2 references the memory area 61. When the flag is set, the Lock variable is assumed to be locked. When the flag is not set, the Lock variable is assumed to be released.

The main CPU wake-up request sending section 44 sends an interrupt signal for causing the main CPU 1b to go to the operating state.

The main CPU 1b and the sub-CPU 2b have functions similar to those of the main CPUs 1 and the sub-CPUs 2 and 2a of the first and second embodiments, except that the main CPU 1b and the sub-CPU 2b can access the memory area determining section 51 and the memory area 61.

Although only one pair of the memory area 61 and the memory area determining section 51 corresponding thereto is illustrated in FIG. 6, any number of the pairs may be provided.

FIGS. 7A to 7D are flowcharts of operations of the information processing device 300 of the third embodiment of the present invention. Hereinafter, the operations of the information processing device 300 of the third embodiment of the present invention will be described with reference to FIGS. 7A to 7D.

When an interrupt signal is sent by any of the peripheral devices 41, 42 and 43, the process request determining section 3b memorizes that the interrupt signal has occurred, by setting a flag in a portion corresponding to the peripheral device 41, 42 or 43 of the interrupt request register 32 (step S41).

Next, the process request determining section 3b references the main CPU status register 31 to determine whether or not the main CPU 1b is in the sleeping state (step S42).

When the main CPU 1b is in the operating state, the process request determining section 3b goes to an operation of step S49. On the other hand, when the main CPU 1b is in the sleeping state, the process request determining section 3b references the sub-CPU status register 33 to determine whether or not the sub-CPU 2b is in the sleeping state (step S43). When the sub-CPU 2b is in the sleeping state, the process request determining section 3b causes the sub-CPU 2b to go to the operating state, rewrites the sub-CPU status register 33 (step S44), and goes to an operation of step S45. On the other hand, when the sub-CPU 2b is in the operating state, the process request determining section 3b goes to the operation of step S45.

In step S45, the process request determining section 3b references the sub-CPU process request completion register 34 to determine whether or not the sub-CPU 2b can accept an interrupt request. When the sub-CPU 2b cannot accept the interrupt request, the process request determining section 3b goes to an operation of step S47. On the other hand, when the sub-CPU 2b can accept the interrupt request, the process request determining section 3b goes to an operation of step S46.

In step S47, the process request determining section 3b determines whether or not the main CPU 1b is in the sleeping state. When the main CPU 1b is in the sleeping state, the process request determining section 3b causes the main CPU 1b to go to the operating state, rewrites the main CPU status register (step S48), and goes to an operation of step S49. On the other hand, when the main CPU 1b is in the operating state, the process request determining section 3b goes to the operation of step S49.

In step S46, the process request determining section 3b sends an interrupt signal to the interrupt determining section 21 of the sub-CPU 2b, and goes to an operation of step S100.

In step S49, the process request determining section 3b sends an interrupt signal to the interrupt determining section 11 of the main CPU 1b, and goes to an operation of step S200.

Figure 7B:
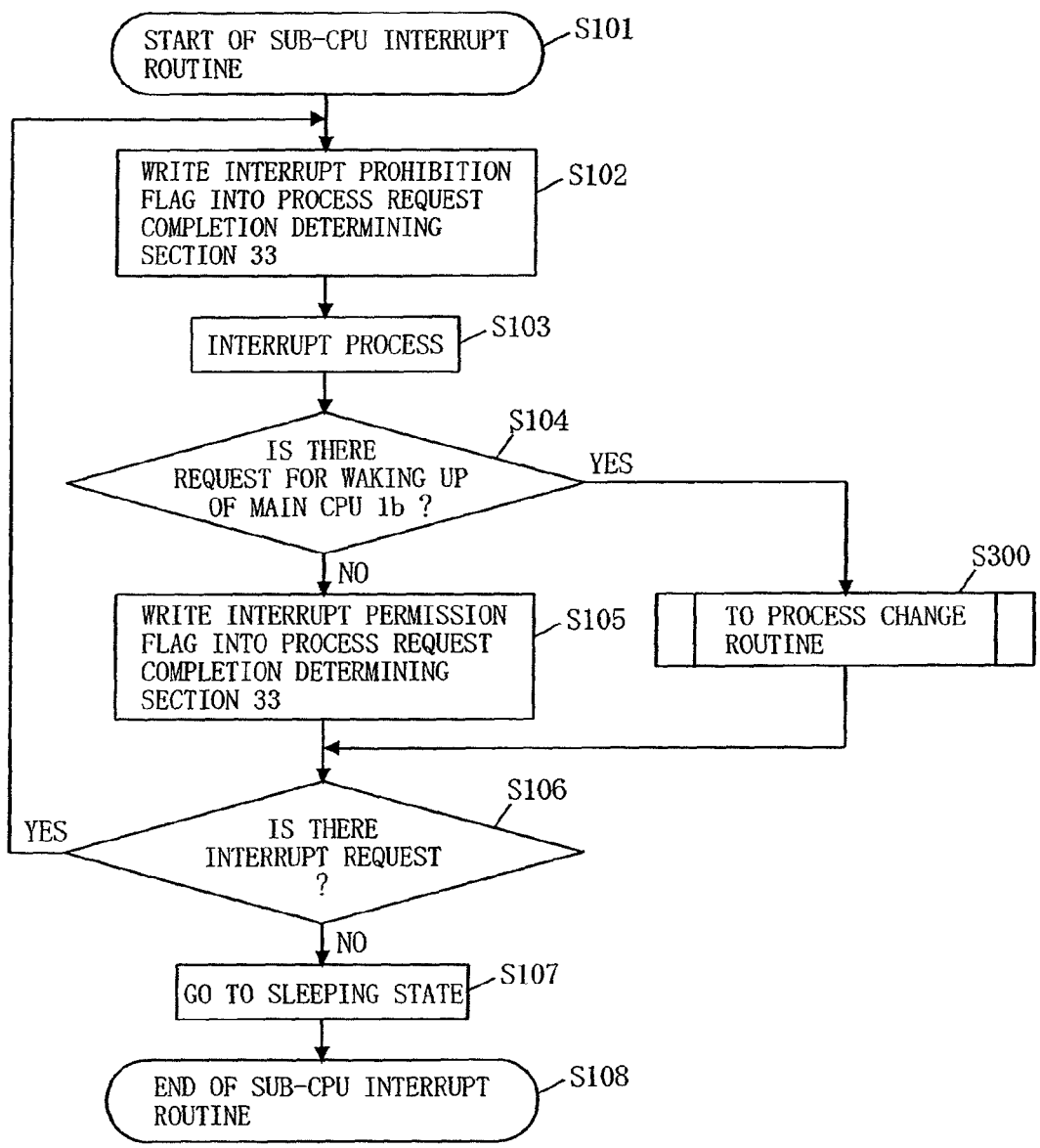
FIG. 7B is a flowchart of an operation of the information processing device 300 of the third embodiment of the present invention.
Figure 7C:
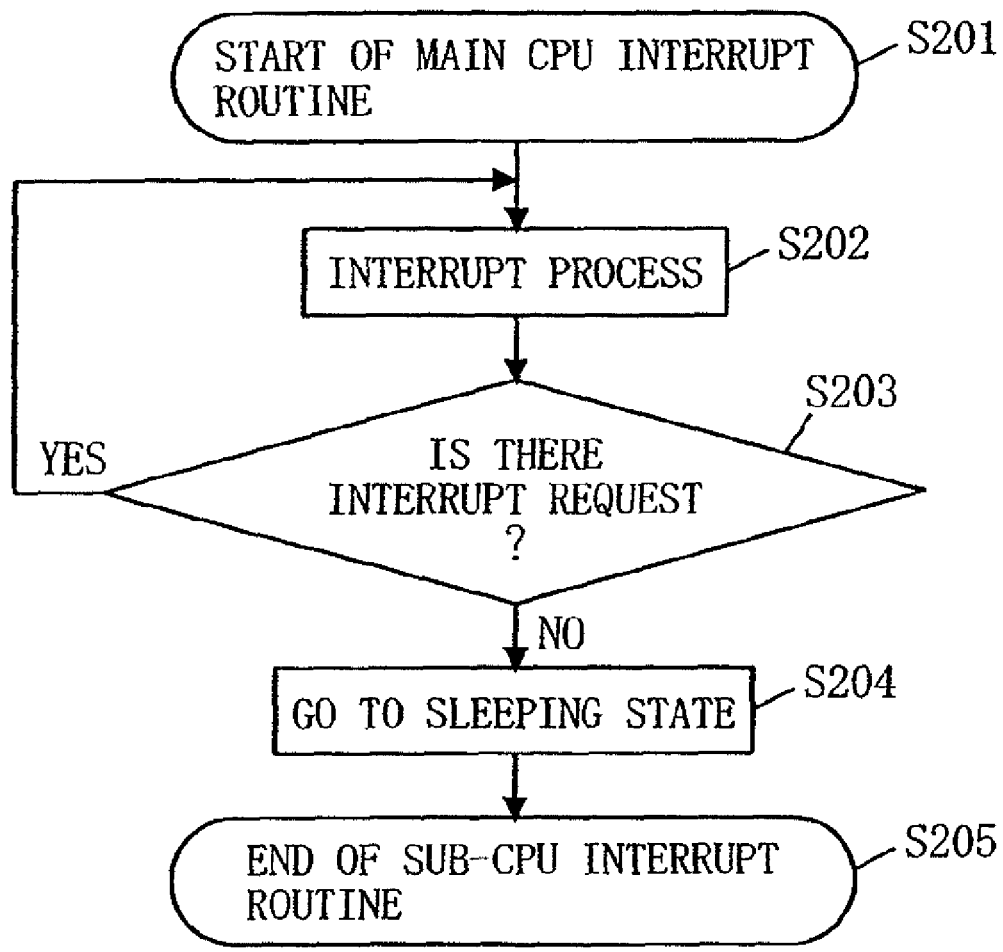
FIG. 7C is a flowchart of an operation of the information processing device 300 of the third embodiment of the present invention.
Figure 7D:
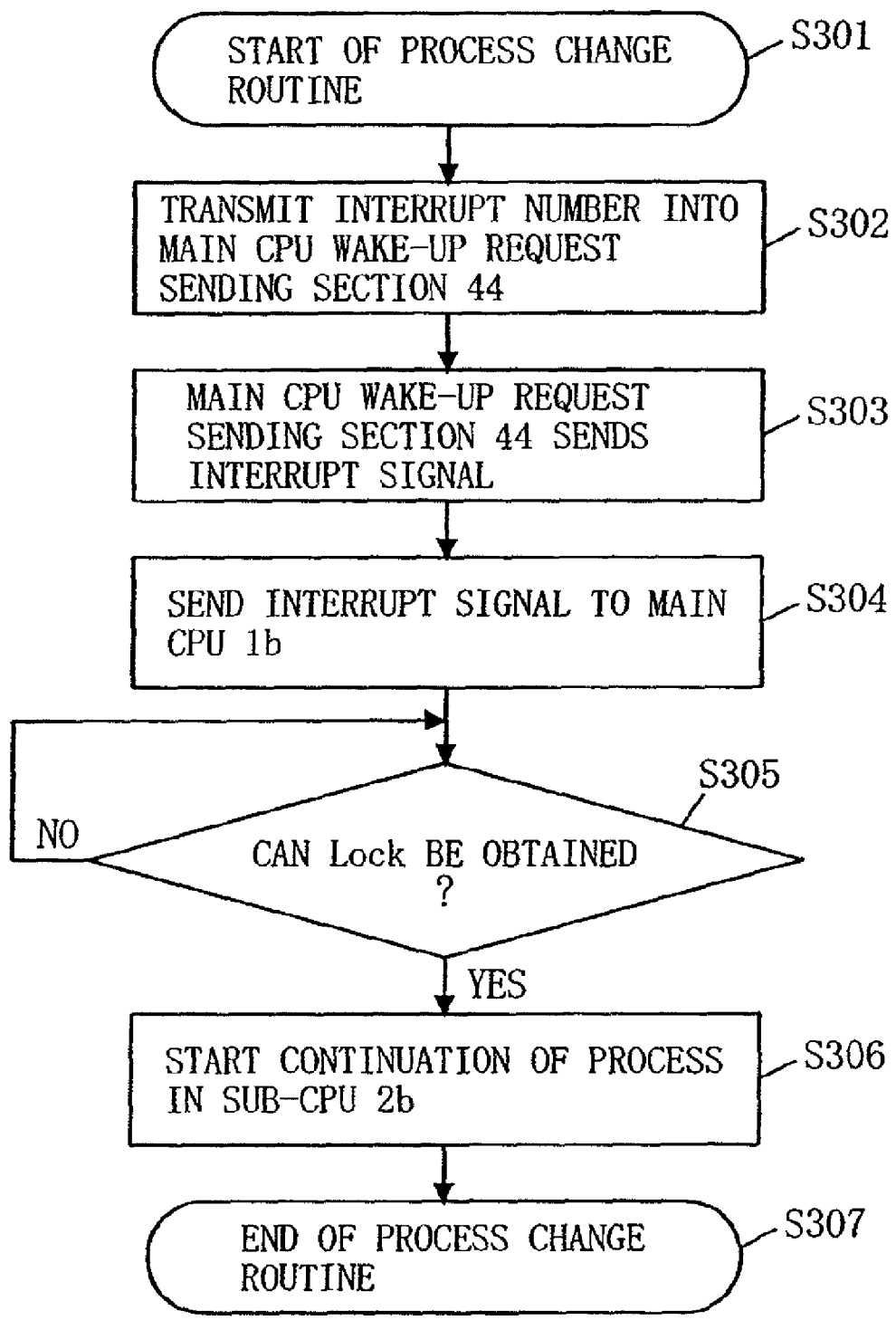
FIG. 7D is a flowchart of an operation of the information processing device 300 of the third embodiment of the present invention.

FIG. 7B is a flowchart of an operation of the information processing device 300 in step S100 of FIG. 7A. Hereinafter, the operation of the information processing device 300 in step S100 of FIG. 7A will be described with reference to FIG. 7B.

The sub-CPU 2b, when detecting an interrupt signal, starts a sub-CPU interrupt routine (step S101), writes an interrupt prohibition flag into the sub-CPU process request completion register 34 (step S102), and executes an interrupt process (step S103). Next, the process request determining section 3b determines whether or not there is a request for waking up of the main CPU 1b during execution of the interrupt process by the sub-CPU 2b (step S104). When there is a request for waking up of the main CPU 1b, the process request determining section 3b executes a process change routine (step S300), and goes to an operation of step S105. On the other hand, when there is not a request for waking up of the main CPU 1b, the process request determining section 3b writes an interrupt permission flag into the sub-CPU process request completion register 34 (step S105) after the interrupt process is finished, and goes to the operation of step S106.

In step S106, the process request determining section 3b determines whether or not a new interrupt request has occurred with respect to the sub-CPU 2 during the interrupt process. When a new interrupt request has occurred, the process request determining section 3b returns to the operation of step S102. On the other hand, when a new interrupt request has not occurred, the process request determining section 3b causes the sub-CPU 2b to go to the sleeping state (step S107), and ends the sub-CPU interrupt routine (step S108).

FIG. 17C is a flowchart of an operation of the information processing device 300 in step S200. The main CPU 1b, when the interrupt determining section 11 detects an interrupt signal, starts a main CPU interrupt routine (step S201). Next, the main CPU 1b executes an interrupt process corresponding to the interrupt signal (step S202). The main CPU 1b determines whether or not a new interrupt request has occurred with respect to the main CPU 1b during step S202 (step S203). When a new interrupt request has occurred, the main CPU 1b returns to step S202 and processes the new interrupt request. On the other hand, when a new interrupt request has not occurred, the main CPU 1b goes to the sleeping state, notifies the main CPU status register of that matter (step S204), and ends the main CPU interrupt routine (step S205).

FIG. 17D is a flowchart of an operation of the information processing device 300 in step S300. Initially, when the process change routine is started (step S301), the sub-CPU 2b transmits a number of an interrupt process (hereinafter referred to as an interrupt number) which has been currently accepted by the sub-CPU 2b, to the main CPU wake-up request sending section 44 (step S302). Next, the main CPU wake-up request sending section 44 sends an interrupt signal including the interrupt number to the process request determining section 3b (step S303). Next, the process request determining section 3b sends the interrupt signal to the main CPU 1b (step S304). Depending on the interrupt signal, the main CPU 1b performs a busy-loop until the Lock variable is obtained from the memory area determining section 51 (step S305), and when the Lock variable is obtained, starts the continuation of the process of the sub-CPU 2b (step S306), and ends the process change routine (step S307).

FIG. 8 is a sequence diagram illustrating a detail of an exemplary method of causing the main CPU 1b to take over a process in the sub-CPU 2b. Initially, the main CPU 1b is assumed to be in the sleeping state (step S401). The sub-CPU 2b executes an interrupt process (step S502), depending on an interrupt signal which is sent thereto (step S501), and obtains a Lock variable from the memory area determining section 51 (step S503). Next, the sub-CPU 2b transmits a request for waking up of the main CPU 1b to the main CPU wake-up request sending section 44 (step S504). In response to this, the main CPU wake-up request sending section 44 sends an interrupt signal to the main CPU 1b, so that an interrupt for waking up of the main CPU 1b is executed (step S505).

The main CPU 1b executes a wake-up process for going to the operating state, depending on the interrupt signal (step S402). After the wake-up process is completed, the main CPU 1b sets the main CPU status register 31 into the operating state. When the main CPU status register 31 goes to the operating state, the process request determining section 3b sends an interrupt signal to the main CPU 1b (step S601), and sends a main CPU wake-up completion interrupt signal as a wake-up completion trigger to the sub-CPU 2b (step S403).

The sub-CPU 2b flashes cache data memorized in the memory area 61, depending on the wake-up completion trigger (step S506), and stores register information into the memory area 61 (step S507).

The main CPU 1b executes a busy-loop for obtaining the Lock variable until the Lock variable is released (step S404). When the sub-CPU 2b releases the Lock variable (step S508), the main CPU 1b goes out of the busy loop and obtains the Lock variable (step S405), obtains the register information stored by the sub-CPU 2b from the memory area 61 (step S406), and starts the continuation of the interrupt process which has been executed in the sub-CPU 2b (step S407). Here, the wake-up completion trigger of the main CPU 1b described in the above-described example is implemented by changing the main CPU status register 31. However, an event for the wake-up completion trigger may be executed by a peripheral device dedicated to notifying the sub-CPU 2b of the event.

Thus, according to the third embodiment, the information processing device 300, when an interrupt signal is sent from a peripheral device, determines whether or not the main CPU 1b is in the sleeping state. When the main CPU 1b is in the sleeping state, the information processing device 300 determines whether or not the sub-CPU 2b can be caused to execute an interrupt process. When the sub-CPU 2b can be caused to execute the interrupt process, the information processing device 300 causes the sub-CPU 2b to execute the interrupt process. Therefore, if the main CPU 1b is in the sleeping state and the sub-CPU 2b can execute an interrupt process, the interrupt process can be executed without waking up the main CPU 1b, so that the main CPU 1b can be caused to be in the sleeping state for a long time, thereby making it possible to reduce power consumption. On the other hand, when the main CPU 1b is in the sleeping state and the sub-CPU 2b cannot execute an interrupt process, the information processing device 300 causes the main CPU 1b to go to the operating state and causes the main CPU 1b to execute the interrupt process. Also, if the main CPU 1b is in the operating state, the information processing device 300 causes the main CPU 1b to execute the interrupt process. Therefore, the response speed of interrupt processes can be improved. Further, if there is a request for waking up of the main CPU 1b during execution of an interrupt process by the sub-CPU 2b, the information processing device 300 is operated so that the main CPU 1b executes the continuation of the process in the sub-CPU 2b. Therefore, the response speed of interrupt processes can be further improved. Thus, in this embodiment, since a CPU to be used is selected, depending on the operating states of the main CPU 1b and the sub-CPU 2b, the information processing device 300 which achieves low power consumption and in which a CPU for processing a request from a peripheral apparatus is not fixedly assigned, is provided. In this embodiment, it is determined which of the CPUs is used to process a process request from a peripheral device, depending on the operating states of the CPUs. Therefore, as is different from the conventional art, it is not necessary to directly connect between the CPUs and the peripheral devices or provide a clear correspondence relationship therebetween. Therefore, if the process request determining section 3b of this embodiment is used, an information processing device which achieves low power consumption and in which a CPU for executing a process request from a peripheral device is not fixed to a main CPU or a sub-CPU can be provided, even when the information processing device has a different hardware configuration.

Note that, in the third embodiment, the interrupt determining sections 11 and 21 may be provided within either the CPU or the process request determining section 3b. Also, the main CPU status register 31 and the sub-CPU status register 33 may be provided within either the CPU or the process request determining section 3b. The sub-CPU process request completion register 34 may also be provided within either the CPU or the process request determining section 3b.

Note that a method of recording an interrupt signal into the interrupt request register 32 may be other format than that of FIG. 6.

Fourth Embodiment

Figure 9:
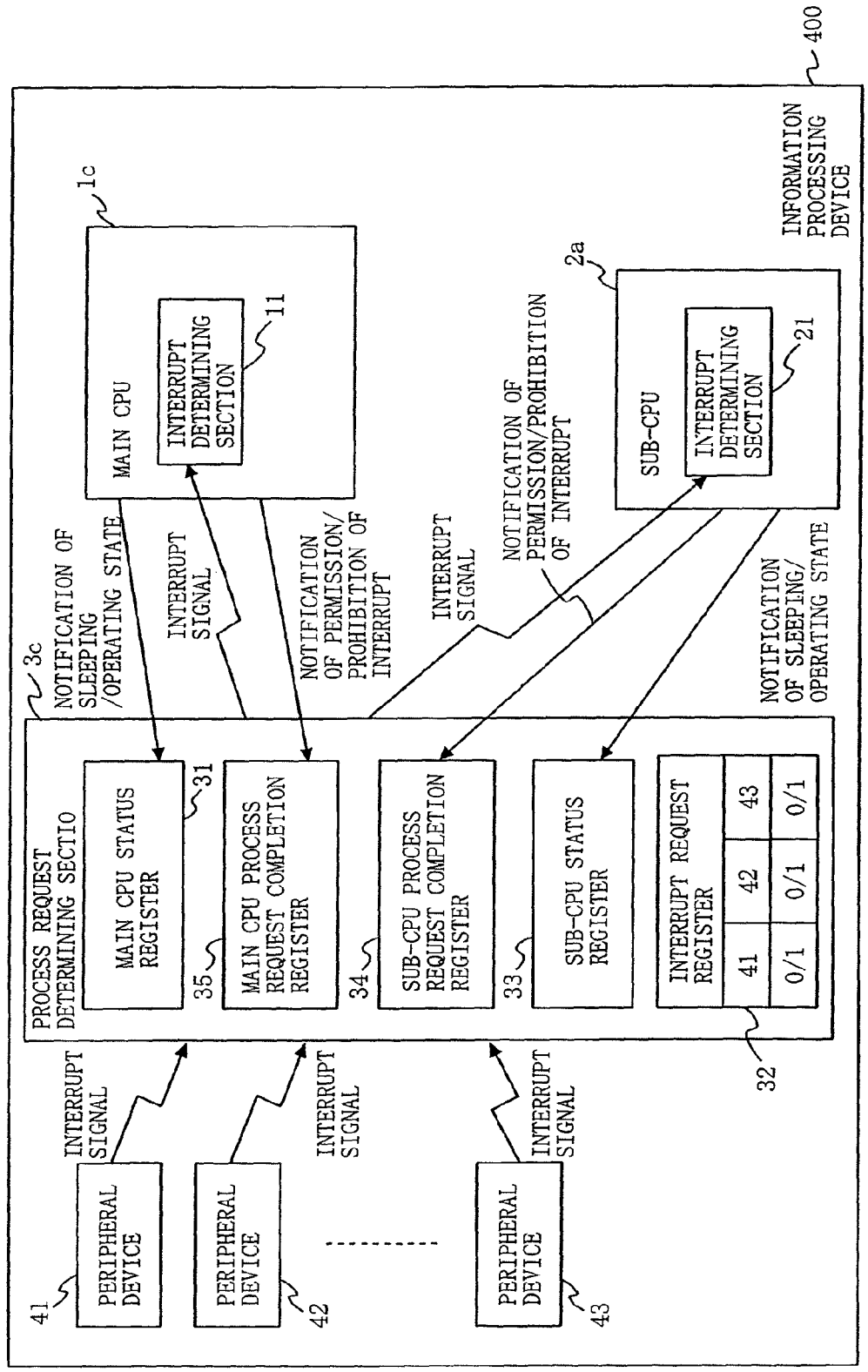
FIG. 9 is a block diagram illustrating a functional configuration of an information processing device 400 according to the fourth embodiment of the present invention.

In a fourth embodiment of the present invention, an information processing device has a hardware configuration similar to that of the first embodiment, and therefore, FIG. 1 is referenced. FIG. 9 is a block diagram illustrating a functional configuration of an information processing device 400 according to the fourth embodiment of the present invention. In FIG. 9, the information processing device 400 comprises a main CPU 1c, a sub-CPU 2a, a process request determining section 3c, and peripheral devices 41 to 43. In FIG. 9, parts having functions similar to those of the second embodiment are indicated by the same reference numerals and will not be described. The process request determining section 3c includes a main CPU status register 31, a main CPU process request completion register 35, an interrupt request register 32, a sub-CPU status register 33, and a sub-CPU process request completion register 34.

The main CPU process request completion register 35 memorizes whether or not the main CPU 1c is prohibited from being interrupted. The main CPU 1c, when receiving an interrupt request, writes a flag indicating that the main CPU 1c is executing an interrupt process, into the main CPU process request completion register 35. When ending the interrupt process, the main CPU 1c writes a flag indicating that the main CPU 1c is not executing an interrupt process, into the main CPU process request completion register 35. Thus, the information processing device 400 of the fourth embodiment has a configuration obtained by adding the main CPU process request completion register 35 to the information processing device 200 of the second embodiment.

Figure 10:
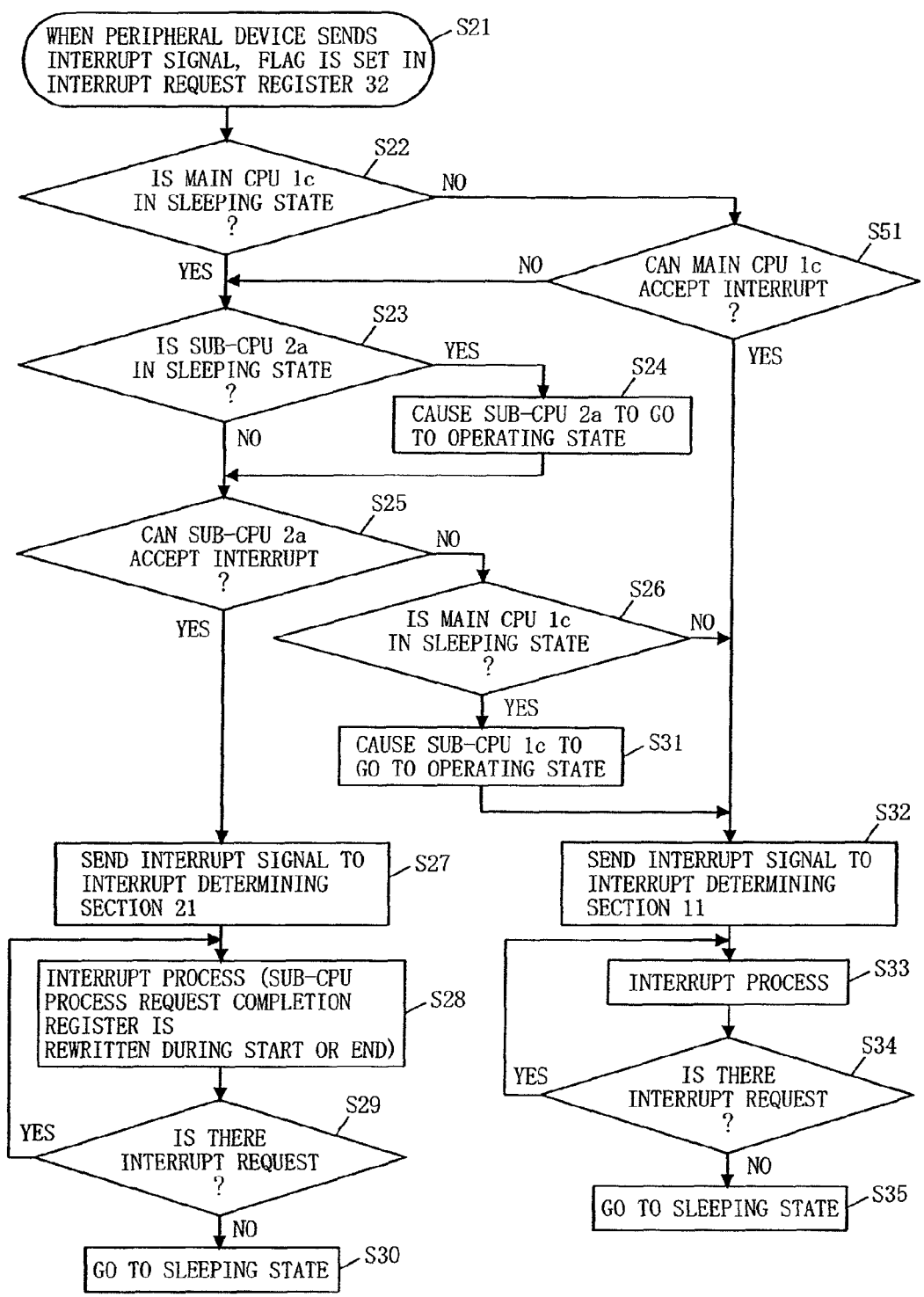
FIG. 10 is a flowchart of an operation of the information processing device 400 of the fourth embodiment of the present invention.

FIG. 10 is a flowchart of an operation of the information processing device 400 of the fourth embodiment of the present invention. Hereinafter, the operation of the information processing device 400 of the fourth embodiment of the present invention will be described with reference to FIG. 10.

The operation of the information processing device 400 has many points in common with the operation of the information processing device 200 of the second embodiment. In the steps of the flowchart of FIG. 10, steps have operations similar to those of the information processing device 200 of the second embodiment are indicated by step numbers similar to those of FIG. 5 and will not be described.

The flowchart of FIG. 10 is different from the flowchart of the second embodiment of FIG. 5 in that an operation of step S51 is added at some midpoint of transition from step S22 to step S32. In step S22, when determining that the main CPU 1c is in the operating state, the process request determining section 3c executes the operation of step S51. In step S51, the process request determining section 3c references a register memorized in the main CPU process request completion register 35 to determine whether or not the main CPU 1c can accept an interrupt. When the main CPU 1c cannot accept an interrupt, the information processing device 400 goes to the operation of step S23. On the other hand, when the main CPU 1c can accept an interrupt, the information processing device 400 goes to the operation of step S32. The subsequent process steps are similar to those of the second embodiment.

Thus, according to the fourth embodiment, when the main CPU 1c is in the sleeping state, the sub-CPU 2a executes an interrupt process, thereby making it possible to cause the main CPU 1c to be in the sleeping state for a long time. On the other hand, when the main CPU 1c is in the operating state, the sub-CPU 2a can also process an interrupt process in parallel. As compared to the second embodiment, the response speed of the information processing device 400 is improved. Therefore, an information processing device which achieves low power consumption and in which the response speed can be improved, is provided.

Fifth Embodiment

Figure 11:
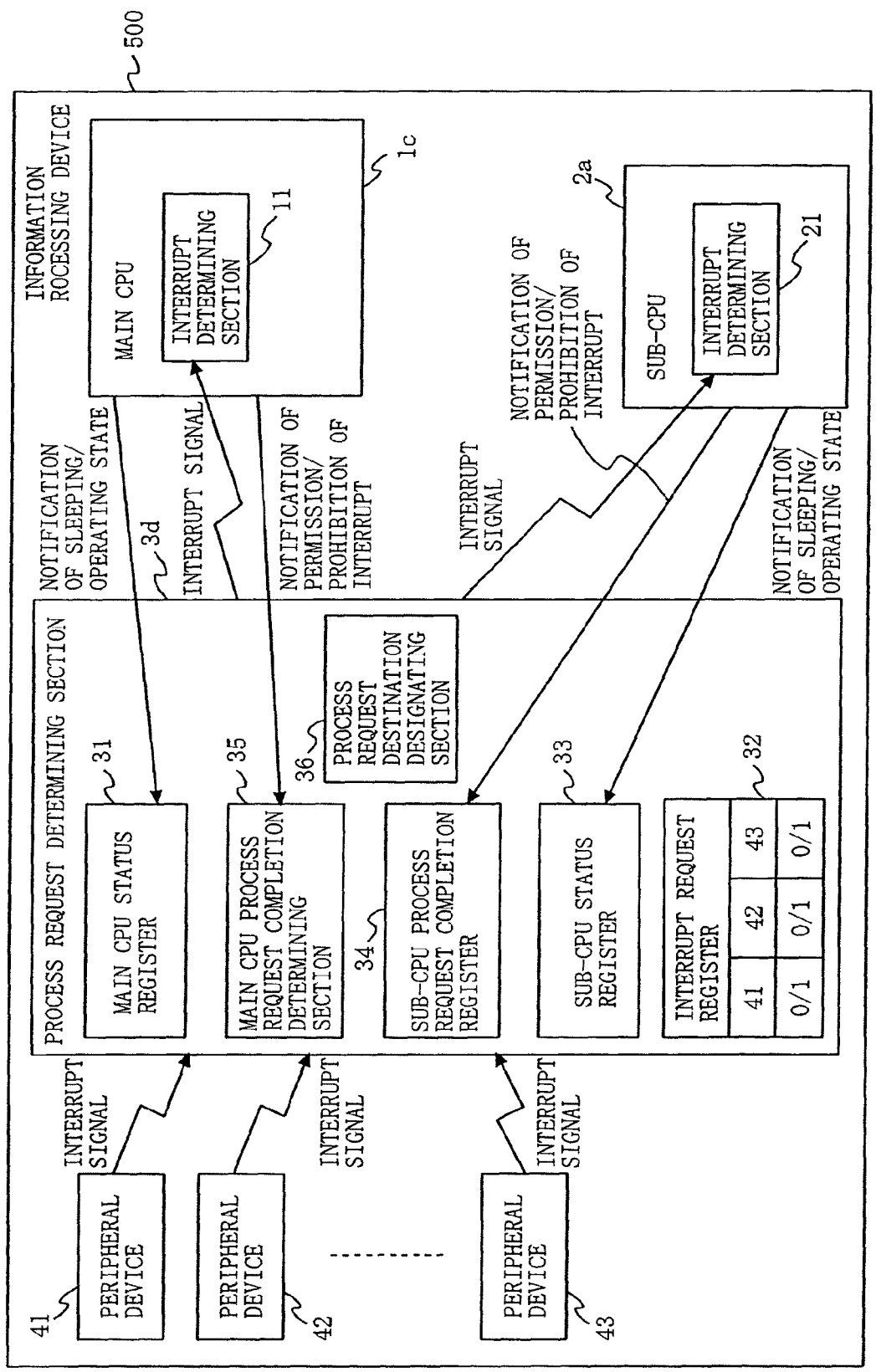
FIG. 11 is a block diagram illustrating a functional configuration of an information processing device 500 of the fifth embodiment of the present invention.

In a fifth embodiment of the present invention, an information processing device has a hardware configuration similar to that of the first embodiment, and therefore, FIG. 1 is referenced. FIG. 11 is a block diagram illustrating a functional configuration of an information processing device 500 of the fifth embodiment of the present invention. In FIG. 11, the information processing device 500 comprises a main CPU 1c, a sub-CPU 2a, a process request determining section 3d, and peripheral devices 41 to 43. In FIG. 11, parts having functions similar to those of the fourth embodiment are indicated by the same reference numerals and will not be described. The process request determining section 3d comprises a main CPU status register 31, a main CPU process request completion register 35, an interrupt request register 32, a sub-CPU status register 33, a sub-CPU process request completion register 34, and a process request destination designating section 36.

The process request destination designating section 36 memorizes information about whether the process request determining section 3d should send an interrupt signal to the main CPU 1c or the sub-CPU 2a (hereinafter referred to as designated CPU information), and information about whether or not a CPU other than a designated CPU may be used (other CPU availability information), in association with interrupt numbers.

FIG. 12 is a diagram illustrating exemplary information memorized in the process request destination designating section 36. In FIG. 12, for example, when an interrupt process from the peripheral device 41 is assigned as an interrupt number, the process request determining section 3d defines that an interrupt signal should be sent to the main CPU 1c, and an interrupt signal may be sent to the sub-CPU 2a. Also, for example, when an interrupt process from the peripheral device 42 (or 43) is assigned as an interrupt number, the process request determining section 3d defines that an interrupt should be sent to the sub-CPU 2a, and an interrupt signal is not permitted to be sent to the main CPU 1c.

The contents of the definition of the process request destination designating section 36 are defined, for example, during initialization of the information processing device 500.

FIGS. 13A to 13D are flowcharts of operations of the information processing device 500 of the fifth embodiment of the present invention. Hereinafter, the operations of the information processing device 500 of the fifth embodiment of the present invention will be described with reference to FIGS. 13A to 13D.

When an interrupt signal is sent by any of the peripheral devices 41, 42 and 43, the process request determining section 3d memorizes that the interrupt signal has occurred, by setting a flag in a portion corresponding to the peripheral device 41, 42 or 43 of the interrupt request register 32 (step S61).

Next, the process request determining section 3d executes a process request destination determining function to determine a CPU which should execute an interrupt process (step S700).

In step S700, when the sub-CPU 2a is designated as a CPU which should execute an interrupt process, the process request determining section 3d references the sub-CPU status register 33 to determine whether or not the sub-CPU 2a is in the sleeping state (step S62). When the sub-CPU 2a is in the sleeping state, the process request determining section 3d causes the sub-CPU 2a to go to the operating state (step S63), and goes to an operation of step S64. On the other hand, when the sub-CPU 2a is in the operating state, the process request determining section 3d goes to the operation of step S64. In step S64, the process request determining section 3d references the sub-CPU process request completion register 34 to determine whether or not the sub-CPU 2a can accept an interrupt process. When the sub-CPU 2a cannot accept an interrupt process, the process request determining section 3d returns to the operation of step S64. On the other hand, when the sub-CPU 2a can accept an interrupt process, the process request determining section 3d sends an interrupt signal to the interrupt determining section 21 (step S65), and executes a sub-CPU interrupt process routine (step S900).

In step S700, when the main CPU 1c is designated as a CPU which should execute an interrupt process, the process request determining section 3d references the main CPU status register 31 to determine whether or not the main CPU 1c is in the sleeping state (step S66). When the main CPU 1c is in the sleeping state, the process request determining section 3d causes the main CPU 1c to go to the operating state (step S67), and goes to an operation of step S68. On the other hand, when the main CPU 1c is in the operating state, the process request determining section 3d goes to the operation of step S68. In step S68, the process request determining section 3d references the main CPU process request completion register 35 to determine whether or not the main CPU 1c can accept an interrupt process. When the main CPU 1c cannot accept an interrupt process, the process request determining section 3d returns to the operation of step S68. On the other hand, when the main CPU 1c can accept an interrupt process, the process request determining section 3d sends an interrupt signal to the interrupt determining section 11 (step S69), and executes a main CPU interrupt process routine (step S800).

Figure 13A:
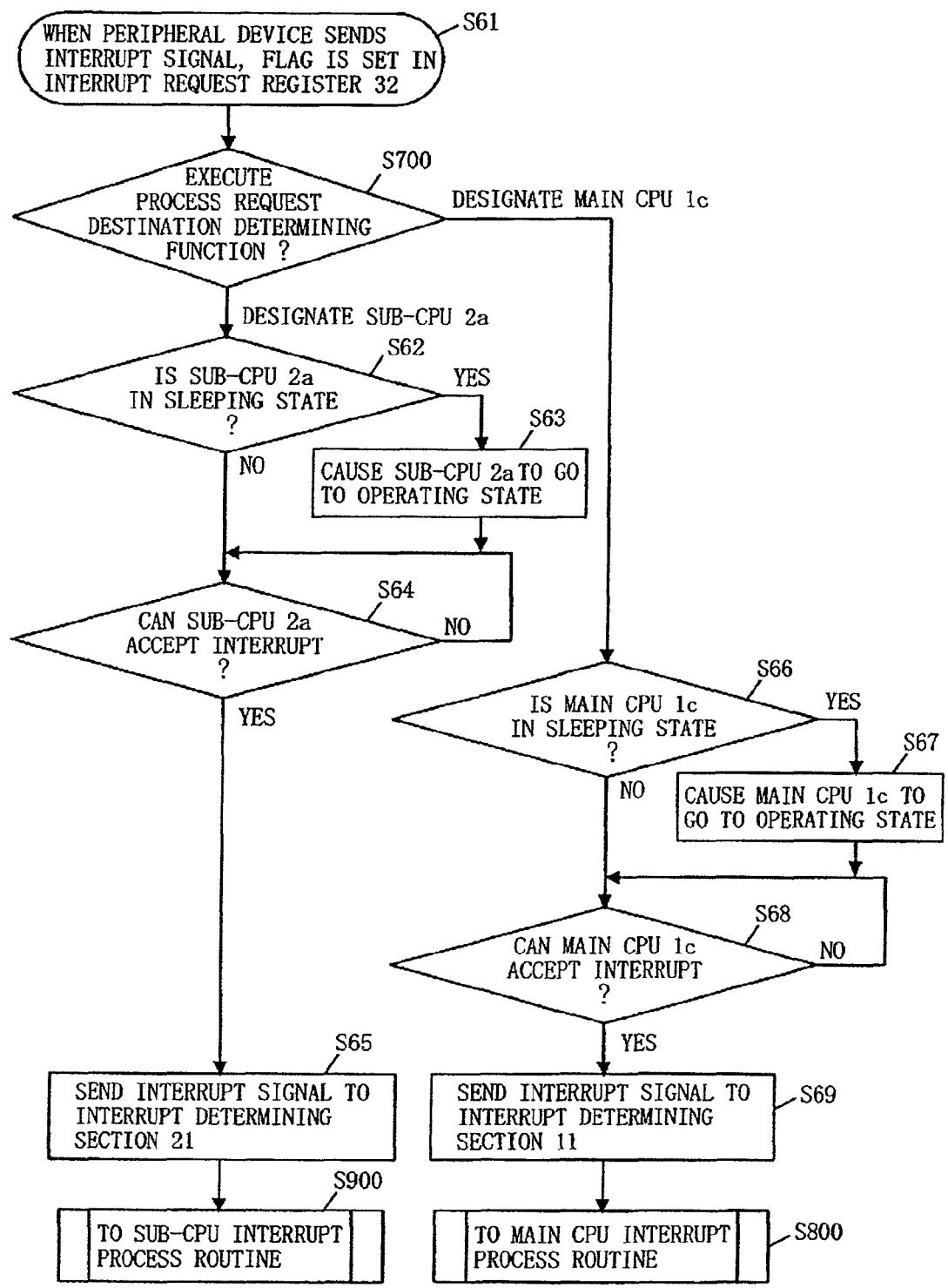
FIG. 13A is a flowchart of an operation of the information processing device 500 of the fifth embodiment of the present invention.
Figure 13B:
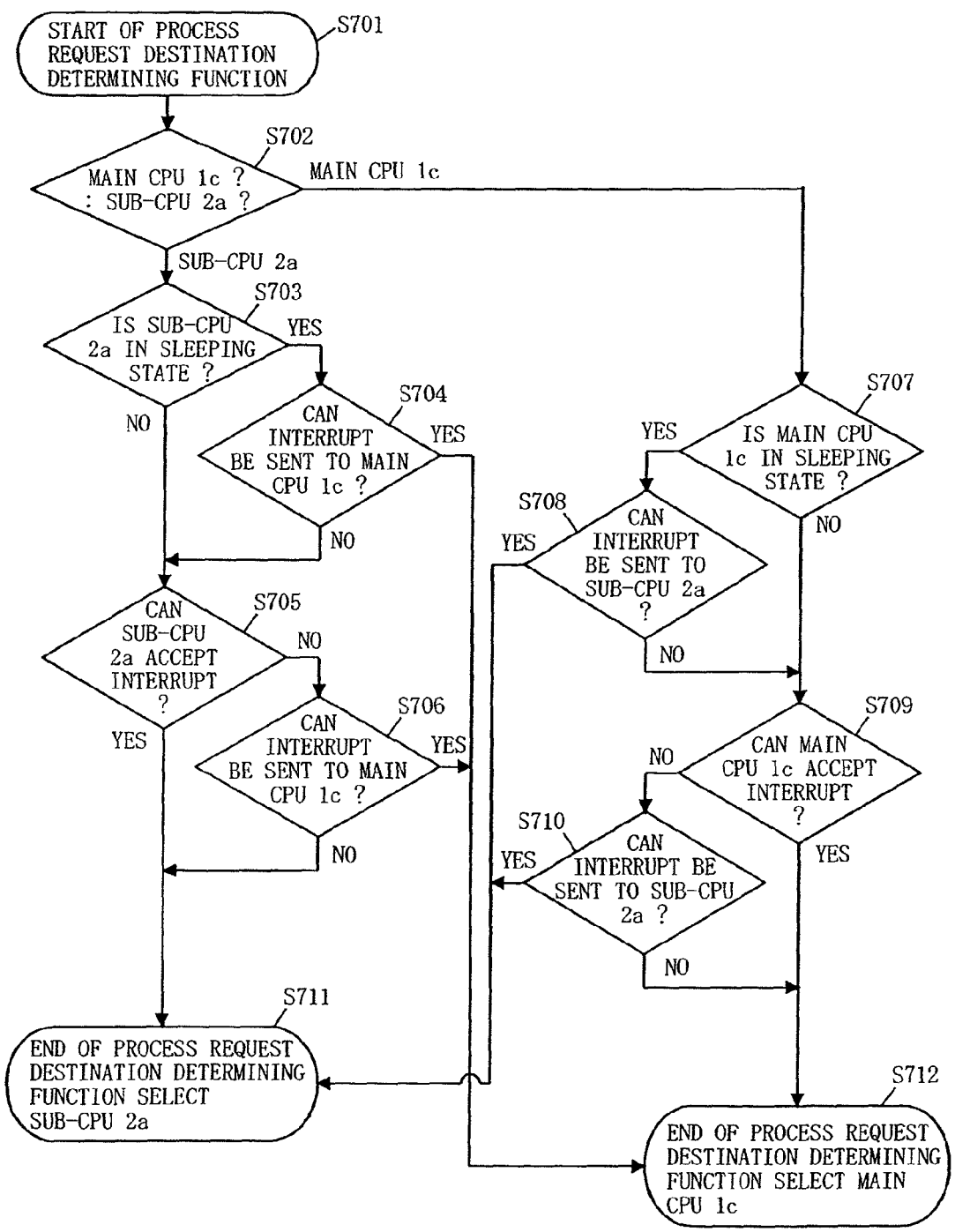
FIG. 13B is a flowchart of an operation of the information processing device 500 of the fifth embodiment of the present invention.

FIG. 13B is a flowchart of the process of step S700 of FIG. 13A. Hereinafter, the process of step S700 of FIG. 13A will be described in detail with reference to FIG. 13B.

When a process request function is started (step S701), the process request determining section 3d references designated CPU information of the process request destination designating section 36 to confirm which of the CPUs is designated with respect to the interrupt signal (step S702).

When the designated CPU is the main CPU 1c, the process request determining section 3d references the main CPU status register 31 to determine whether or not the main CPU 1c is in the sleeping state (step S707). When the main CPU 1c is in the operating state, the process request determining section 3d goes to an operation of step S709. On the other hand, when the main CPU 1c is in the sleeping state, the process request determining section 3d references the other CPU availability information of the process request destination designating section 36 to determine whether or not an interrupt signal is permitted to be sent to the sub-CPU 2a (step S708). When an interrupt signal is permitted to be sent to the sub-CPU 2a, the process request determining section 3d selects the sub-CPU 2a as a process request destination CPU, and ends the process request destination determining function (step S711). On the other hand, when an interrupt signal is not permitted to be sent to the sub-CPU 2a, the process request determining section 3d goes to the operation of step S709.

In step S709, the process request determining section 3d references the main CPU process request completion register 35 to determine whether or not the main CPU 1c can accept an interrupt. When the main CPU 1c can accept an interrupt, the process request determining section 3d selects the main CPU 1c as a process request destination CPU, and ends the process request destination determining function (step S712). On the other hand, when the main CPU 1c cannot accept an interrupt, the process request determining section 3d determines whether or not an interrupt signal is permitted to be sent to the sub-CPU 2a, as is similar to step S708 (step S710). When an interrupt signal is permitted to be sent to the sub-CPU 2a, the process request determining section 3d selects the sub-CPU 2a as a process request destination CPU, and ends the process request destination determining function (step S711). On the other hand, when an interrupt signal is not permitted to the sub-CPU 2a, the process request determining section 3d selects the main CPU 1c as a process request destination CPU, and ends the process request destination determining function (step S712).

In step S702, when the designated CPU is the sub-CPU 2a, the process request determining section 3d references the sub-CPU status register 33 to determine whether or not the sub-CPU 2a is in the sleeping state (step S703). When the sub-CPU 2a is in the operating state, the process request determining section 3d goes to an operation of step S705. On the other hand, when the sub-CPU 2a is in the sleeping state, the process request determining section 3d references the other CPU availability information of the process request destination designating section 36 to determine whether or not an interrupt signal is permitted to be sent to the main CPU 1c (step S704). When an interrupt signal is permitted to be sent to the main CPU 1c, the process request determining section 3d selects the main CPU 1c as a process request destination CPU, and ends the process request destination determining function (step S712). On the other hand, when an interrupt signal is not permitted to be sent to the main CPU 1c, the process request determining section 3d goes to the operation of step S705.

In step S705, the process request determining section 3d references the sub-CPU process request completion register 34 to determine whether or not the sub-CPU 2a can accept an interrupt. When the sub-CPU 2a can accept an interrupt, the process request determining section 3d selects the sub-CPU 2a as a process request destination CPU, and ends the process request destination determining function (step S711). On the other hand, when the sub-CPU 2a cannot accept an interrupt, the process request determining section 3d determines whether or not an interrupt signal is permitted to be sent to the main CPU 1c, as is similar to step S704 (step S706). When an interrupt signal is permitted to be sent to the main CPU 1c, the process request determining section 3d selects the main CPU 1c as a process request destination CPU, and ends the process request destination determining function (step S712). On the other hand, when an interrupt signal is not permitted to be sent to the main CPU 1c, the process request determining section 3d selects the sub-CPU 2a as a process request destination CPU, and ends the process request destination determining function (step S711).

Figure 13C:
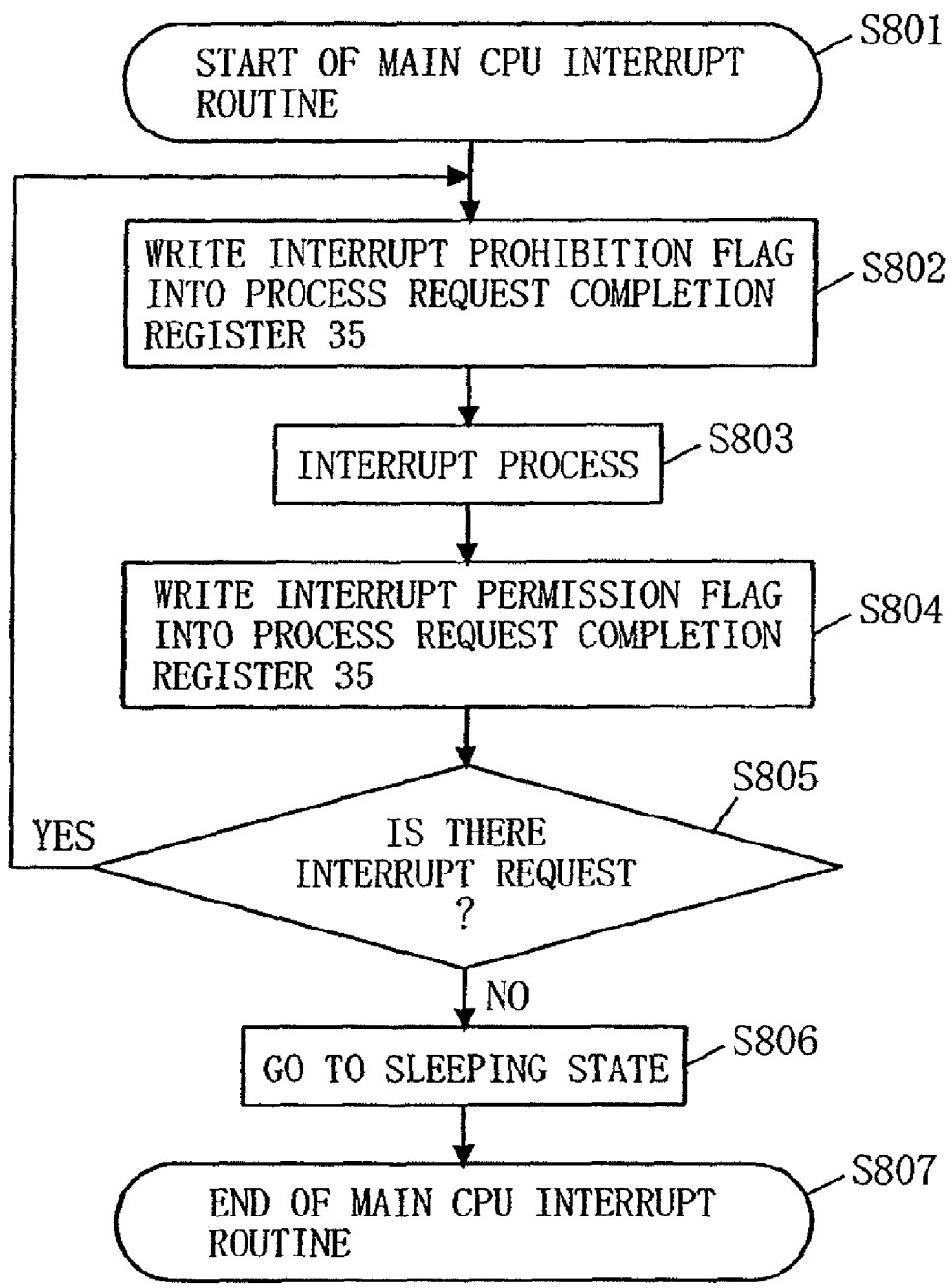
FIG. 13C is a flowchart of an operation of the information processing device 500 of the fifth embodiment of the present invention.

FIG. 13C is a flowchart of a detail of the main CPU interrupt process routine in step S800 of FIG. 13A. Hereinafter, the main CPU interrupt process routine in step S800 of FIG. 13A will be described in detail with reference to FIG. 13C.

When the main CPU interrupt process routine is started and the interrupt determining section 11 detects an interrupt signal (step S801), the main CPU 1c writes an interrupt prohibition flag into the main CPU process request completion register 35 (step S802), and executes an interrupt process corresponding to an interrupt number (step S803). When the interrupt process is finished, the main CPU 1c writes an interrupt permission flag into the main CPU process request completion register 35 (step S804). Next, the main CPU 1c references the interrupt determining section 11 to determine whether or not there is an interrupt request (step S805). When there is an interrupt request, the main CPU 1c returns to the operation of step S802. On the other hand, when there is not an interrupt request, the main CPU 1c goes to the sleeping state (step S806), and ends the main CPU interrupt process routine (step S807).

Figure 13D:
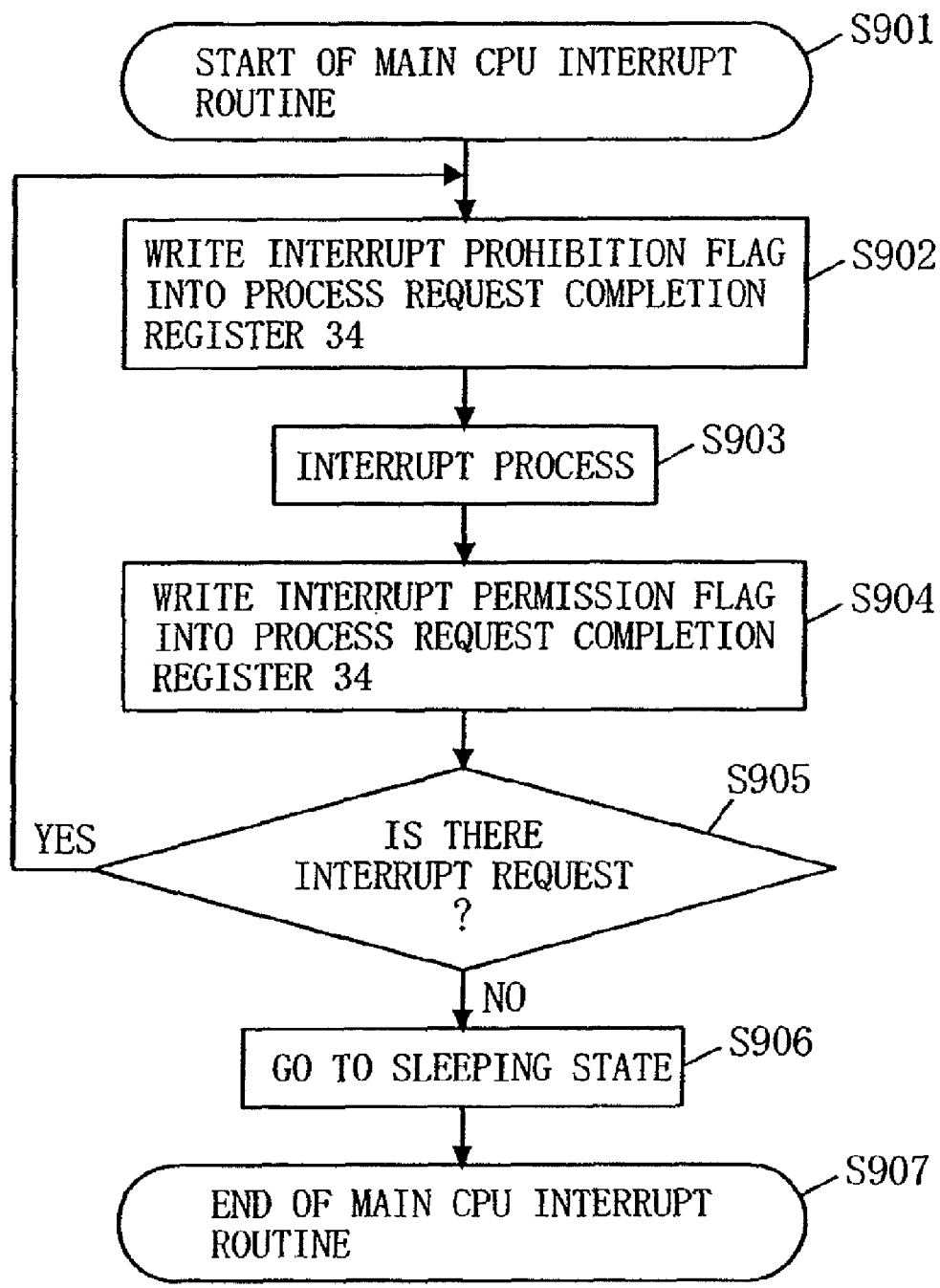
FIG. 13D is a flowchart of an operation of the information processing device 500 of the fifth embodiment of the present invention.

FIG. 13D is a flowchart of a detail of the sub-CPU interrupt process routine in step S900 of FIG. 13A. Hereinafter, the sub-CPU interrupt process routine in step S900 of FIG. 13A will be described in detail with reference to FIG. 13D.

When the sub-CPU interrupt process routine is started and the interrupt determining section 21 detects an interrupt signal (step S901), the sub-CPU 2a writes an interrupt prohibition flag into the sub-CPU process request completion register 34 (step S902), and executes an interrupt process corresponding to an interrupt number (step S903). When the interrupt process is finished, the sub-CPU 2a writes an interrupt permission flag into the sub-CPU process request completion register 34 (step S904). Next, the sub-CPU 2a references the interrupt determining section 21 to determine whether or not there is an interrupt request (step S905). When there is an interrupt request, the sub-CPU 2a returns to the operation of step S902. On the other hand, when there is not an interrupt request, the sub-CPU 2a goes to the sleeping state (step S906), and ends the sub-CPU interrupt process routine (step S907).

Thus, according to the fifth embodiment, it is possible to flexibly determine which of the CPUs is caused to perform a process, for each interrupt, so that, for example, an event which has a relatively small processing load and is executed in short cycles is assigned to the sub-CPU 2a, and other events are assigned to the main CPU 1c, thereby making it possible to reduce power consumption. Also, in the fifth embodiment, when the main CPU 1c is designated by the process request destination designating section 36, the information processing device 500 initially determines whether or not the main CPU 1c is in the sleeping state (see step S707 of FIG. 13B). When the main CPU 1c is in the sleeping state, the information processing device 500 determines whether or not an interrupt process can be executed by the sub-CPU 2a (see step S708 of FIG. 13B). When an interrupt process can be executed by the sub-CPU 2a, the information processing device 500 causes the sub-CPU 2a to execute the interrupt process. Therefore, if the main CPU 1c is in the sleeping state and the sub-CPU 2a can execute an interrupt process, the interrupt process can be executed without waking up the main CPU 1c, so that the main CPU 1c can be caused to be in the sleeping state for a long time, thereby making it possible to reduce power consumption. On the other hand, when the main CPU 1c is in the operating state, the process request determining section 3d determines whether or not an interrupt process can be executed by the main CPU 1c. When the interrupt process can be executed by the main CPU 1c, the interrupt process is executed by the main CPU 1c, so that the response speed is improved.

Note that, in the fifth embodiment, the interrupt determining sections 11 and 21 may be provided within either the CPU or the process request determining section 3d. Also, the main CPU status register 31 and the sub-CPU status register 33 may be provided within either the CPU or the process request determining section 3d. The sub-CPU process request completion register 34 may also be provided within either the CPU or the process request determining section 3d.

Note that a method of recording an interrupt signal into the interrupt request register 32 may be other than that of FIG. 11.

Note that, in the fifth embodiment, as a process until an interrupt can be accepted, a busy loop is used as illustrated in steps S64 and S68 of FIG. 13A. However, the process request determining section 3d may accumulate interrupt processes in a data structure, such as a queue, in time series, and send the subsequent interrupt signals while monitoring the interrupt determining sections 11 and 21.

Note that, in the fifth embodiment, as in the third embodiment, a mechanism for causing the main CPU 1c to take over a process in the sub-CPU 2a can be introduced. This can be implemented by a method which will be clearly understood from FIGS. 7B to 7D and 8 of the third embodiment.

Note that, in the fifth embodiment, at least one of steps S709, S703 and S705 may be dispensable.

Sixth Embodiment

An information processing device according to a sixth embodiment of the present invention has parts similar to those of the fifth embodiment, and therefore, FIGS. 1, 11 and 12 are referenced.

Figure 14:
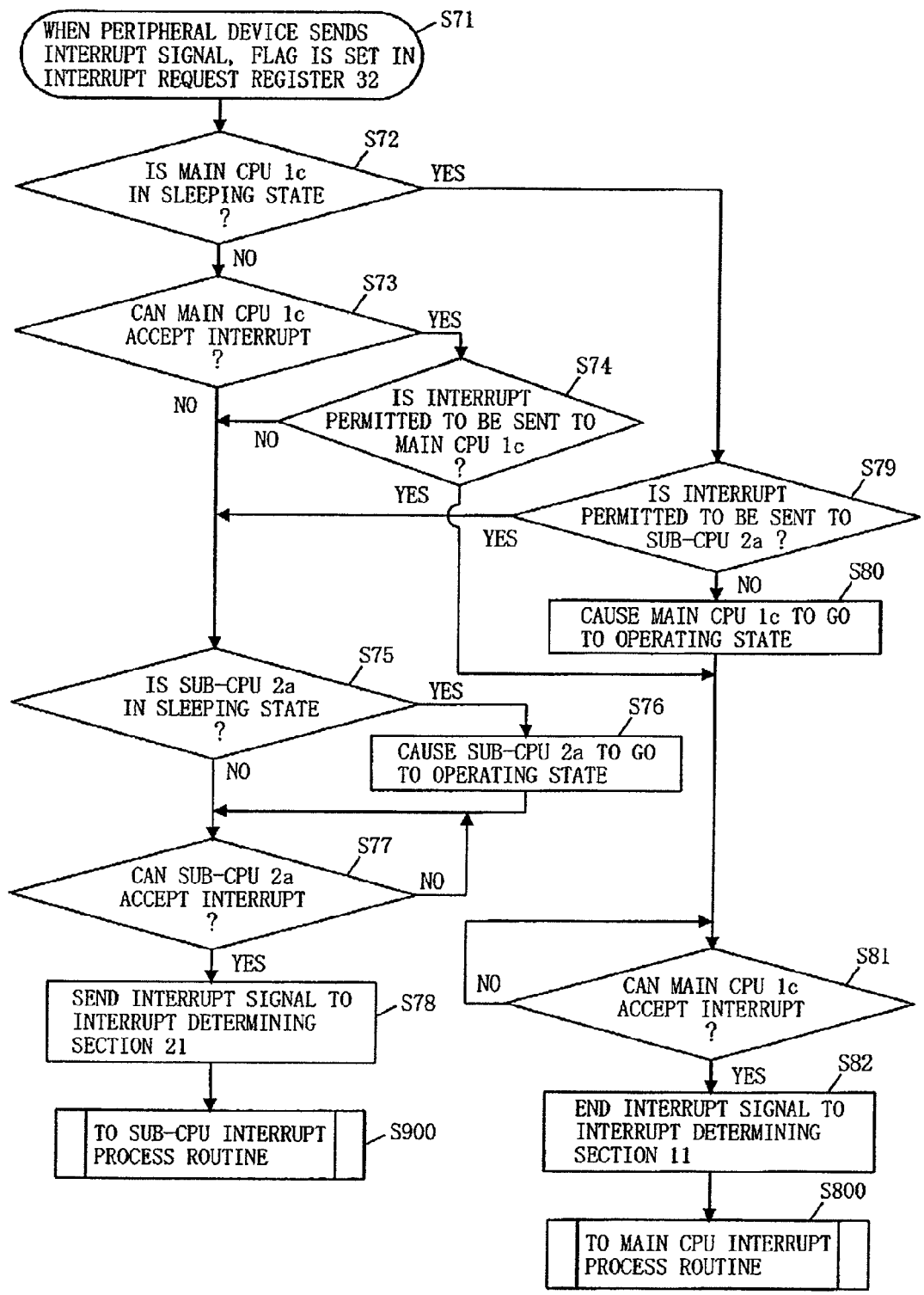
FIG. 14 is a flowchart of an operation of a information processing device according to a sixth embodiment of the present invention.

FIG. 14 is a flowchart of an operation of the information processing device of the sixth embodiment of the present invention. Hereinafter, the operation of the information processing device of the sixth embodiment of the present invention will be described with reference to FIG. 14.

When an interrupt signal is sent by any of the peripheral devices 41, 42 and 43, the process request determining section 3d memorizes that the interrupt signal has occurred, by setting a flag in a portion corresponding to the peripheral device 41, 42 or 43 of the interrupt request register 32 (step S71).

Next, the process request determining section 3d references the main CPU status register 31 to determine whether or not the main CPU 1 is in the sleeping state (step S72).

In step S72, when determining that the main CPU 1 is in the operating state, the process request determining section 3d references the main CPU process request completion register 35 to determine whether or not the main CPU 1c can accept an interrupt (step S73). When the main CPU 1c can accept an interrupt, the process request determining section 3d references designated CPU information on a table defined in the process request destination designating section 36 to determine whether or not an interrupt signal is permitted to be sent to the main CPU 1c, depending on whether or not the main CPU 1c is designated as a designated CPU (step S74). Here, as an example of the table defined in the process request destination designating section 36, a table on which only designated CPU information is defined in association with interrupt numbers as illustrated in FIG. 15 as well as FIG. 12, may be used.

In step S74, when an interrupt signal is not permitted to be sent to the main CPU 1c, the process request determining section 3d goes to an operation of step S75. On the other hand, when an interrupt signal is permitted to be sent to the main CPU 1c, the process request determining section 3d goes to an operation of step S81.

In step S75, the process request determining section 3d references the sub-CPU status register 33 to determine whether or not the sub-CPU 2a is in the sleeping state.

When the sub-CPU 2a is in the sleeping state, the process request determining section 3d causes the sub-CPU 2a to go to the operating state (step S76), and goes to an operation of step S77. On the other hand, when the sub-CPU 2a is not in the sleeping state, the process request determining section 3d goes to the operation of step S77.

In step S77, the process request determining section 3d references the sub-CPU process request completion register 34 to determine whether or not the sub-CPU 2a can accept an interrupt signal.

When the sub-CPU 2a cannot accept an interrupt, the process request determining section 3d returns to the operation of step S77, and while it is determined that the sub-CPU 2a cannot accept an interrupt, the process request determining section 3d performs a busy-loop to wait until the sub-CPU 2a can accept an interrupt. When the sub-CPU 2a can accept an interrupt signal, the process request determining section 3d sends an interrupt signal to the interrupt determining section 21 (step S78), and executes a sub-CPU interrupt process routine (step S900). The sub-CPU interrupt process routine is similar to that of the fifth embodiment, and therefore, FIG. 13D is referenced, and the sub-CPU interrupt process routine will not be described.

In step S72, when determining that the main CPU 1c is in the sleeping state, the process request determining section 3d references the designated CPU information on the table defined in the process request destination designating section 36 to determine whether or not an interrupt signal is permitted to be sent to the sub-CPU 2a (step S79). When an interrupt signal is permitted to be sent to the sub-CPU 2a, the process request determining section 3d goes to the operation of step S75. On the other hand, when determining that an interrupt signal is not permitted to be sent to the sub-CPU 2a, the process request determining section 3d causes the main CPU 1c to go to the operating state (step S80), and goes to the operation of step S81.

In step S81, the process request determining section 3d references the main CPU process request completion register 35 to determine whether or not the main CPU 1c can accept an interrupt. When the main CPU 1c cannot accept an interrupt, the process request determining section 3d returns to the operation of step S81, and performs a busy-wait until the main CPU 1c can accept an interrupt. When the main CPU 1c can accept an interrupt, the process request determining section 3d sends an interrupt signal to the interrupt determining section 11 (step S82), and executes a main CPU interrupt process routine (step S800). The main CPU interrupt process routine is similar to that of the fifth embodiment, and therefore, FIG. 13C is referenced, and the main CPU interrupt process routine will not be described.

Thus, according to the sixth embodiment, for example, it is possible to flexibly determine which of the CPUs is caused to perform a process, for each interrupt, so that an event which has a relatively small processing load and is executed in short cycles is assigned to the sub-CPU 2b, and other events are assigned to the main CPU 1, thereby making it possible to reduce power consumption. Also, in the sixth embodiment, the information processing device initially determines whether or not the main CPU 1c is in the sleeping state (see step S72 of FIG. 14). When the main CPU 1c is in the sleeping state, the information processing device determines whether or not an interrupt process can be executed by the sub-CPU 2a (see step S79 of FIG. 14). When an interrupt process can be executed by the sub-CPU 2a, the information processing device causes the sub-CPU 2a to execute the interrupt process. Therefore, if the main CPU 1c is in the sleeping state and the sub-CPU 2a can execute an interrupt process, the interrupt process can be executed without waking up the main CPU 1c, so that the main CPU 1c can be caused to be in the sleeping state for a long time, thereby making it possible to reduce power consumption. On the other hand, when the main CPU 1c is in the operating state, the process request determining section 3d determines whether or not an interrupt process can be executed by the main CPU 1c (step S74 of FIG. 14). When the interrupt process can be executed by the main CPU 1c, the information processing device causes the main CPU 1c to execute the interrupt process. Therefore, the response speed is improved.

Note that, in the sixth embodiment, the interrupt determining sections 11 and 21 may be provided within either the CPU or the process request determining section 3d. Also, the main CPU status register 31 and the sub-CPU status register 33 may be provided within either the CPU or the process request determining section 3d. The sub-CPU process request completion register 34 may also be provided within either the CPU or the process request determining section 3d.

Note that a method of recording an interrupt signal into the interrupt request register 32 may be other format than that of FIG. 11.

Note that, in the sixth embodiment, as a process until an interrupt can be accepted, a busy loop is used as illustrated in steps S77 and S81 of FIG. 14. However, the process request determining section 3d may accumulate interrupt processes in a data structure, such as a queue, in time series, and send the subsequent interrupt signals while monitoring the interrupt determining sections 11 and 21.

Note that, in the sixth embodiment, as in the third embodiment, a mechanism for causing the main CPU 1c to take over a process in the sub-CPU 2a can be introduced. This can be implemented by a method which will be clearly understood from FIGS. 7B to 7D and 8 of the third embodiment.

Note that the interrupt controller (M4) may be a general-purpose computer device (e.g., a microcomputer, etc.), a program stored in a memory device may be read into the computer device, and the operations described in the embodiments are executed by the computer device, thereby implementing the process request determining section. The program may be previously incorporated into the information processing device, or may be lately installed into the information processing device.

Note that functional blocks for implementing the information processing device of the present invention (e.g., the process request determining section), may be typically implemented as an integrated circuit (LSI). Each functional block may be separately mounted on one chip, or a part or the whole of the functional blocks may be mounted on one chip. Here, the term LSI is used. LSI may be also called IC, system LSI, super LSI or ultra LSI, depending on the packaging density. Also, the integrated circuit is not limited to LSI. The integrated circuit may be achieved by a dedicated circuit or a general-purpose processor. Further, a Field Programmable Gate Array (FPGA) which can be programmed after LSI production or a reconfigurable processor in which connections or settings of circuit cells in LSI can be reconfigured, may be used. Furthermore, if an integrated circuit technology which replaces LSI is developed by an advance in the semiconductor technology or the advent of other technologies derived therefrom, the functional blocks may be packaged using such a technology. A biotechnology may be applicable.

While the invention has been described in detail, the foregoing description is in all aspects illustrative and not restrictive. It is understood that numerous other modifications and variations can be devised without departing from the scope of the invention.

INDUSTRIAL APPLICABILITY

The information processing device of the present invention can perform a process using a sub-CPU having low power consumption without causing a main CPU having high performance and high power consumption to frequently go to the operating state. Therefore, the information processing device of the present invention is useful for mobile terminal devices driven by a battery, and the like. Also, the information processing device of the present invention is applicable to various home appliances, information processing devices, industrial devices, and the like which are expected to exhibit a power reducing effect, as well as mobile terminal devices.

The invention claimed is:

1. An interrupt control circuit for sending an interrupt signal from any one of internal and external peripheral devices to at least either one of a first CPU and a second CPU, wherein
    the first CPU is operable to take at least two states which are an operating state and a sleeping state, and
    the interrupt control circuit is configured to:
        determine whether the first CPU is in the operating state or the sleeping state;
        determine whether the second CPU is operable to process the interrupt signal, when the first CPU is in the sleeping state, and determine whether the first CPU is operable to process the interrupt signal, when the first CPU is in the operating state; and
        send the interrupt signal to at least either one of the first CPU and the second CPU in accordance with a result of the determinations.

2. The interrupt control circuit according to claim 1, wherein the sleeping state represents a state where the first CPU is not operating.

3. The interrupt control circuit according to claim 1, wherein the interrupt control circuit is configured to determine whether the second CPU is operable to process the interrupt signal upon determination of whether the second CPU is operable to receive the interrupt signal.

4. The interrupt control circuit according to claim 3, wherein the interrupt control circuit is configured to determine that the second CPU is operable to receive the interrupt signal when the second CPU is not executing an interrupt request.

5. The interrupt control circuit according to claim 1, wherein
    the second CPU is operable to take at least two states which are an operating state and a sleeping state, and
    the interrupt control circuit is configured to determine whether the second CPU is operable to process the interrupt signal upon determination of whether the second CPU is in the operating state or the sleeping state.

6. The interrupt control circuit according to claim 1, wherein power consumption of the first CPU is different from that of the second CPU.

7. A processing method performed in an interrupt control circuit which sends an interrupt signal relating to a request from any one of internal and external peripheral devices to at least either one of a first CPU and a second CPU, the first CPU being operable to take at least two states which are an operating state and a sleeping state, the processing method comprising:
    determining whether the first CPU is in the operating state or the sleeping state;
    determining whether the second CPU is operable to process the interrupt signal, when the first CPU is in the sleeping state, and determining whether the first CPU is operable to process the interrupt signal, when the first CPU is in the operating state; and
    sending the interrupt signal to at least either one of the first CPU and the second CPU in accordance with a result of the determinations.

8. An information processing device for controlling more than one internal or external peripheral device, the information processing device comprising:
    a first CPU which is operable to take at least two states which are an operating state and a sleeping state;
    a second CPU; and
    a process request determining section for sending an interrupt signal relating to a request from one of the internal or external peripheral devices to at least either one of the first CPU and the second CPU, wherein
    the process request determining section is configured to:
        determine whether the first CPU is in the operating state or the sleeping state;
        determine whether the second CPU is operable to process the interrupt signal, when the first CPU is in the sleeping state, and determine whether the first CPU is operable to process the interrupt signal, when the first CPU is in the operating state; and
        in accordance with a result of the determinations, send the interrupt signal to at least either one of the first CPU and the second CPU.

* * * * *